United States Patent
Heeres et al.

(10) Patent No.: US 11,263,546 B2
(45) Date of Patent: Mar. 1, 2022

(54) TECHNIQUES OF OSCILLATOR STATE MANIPULATION FOR QUANTUM INFORMATION PROCESSING AND RELATED SYSTEMS AND METHODS

(71) Applicant: Yale University, New Haven, CT (US)

(72) Inventors: Reinier Heeres, Heemskerk (NL); Philip Reinhold, New Haven, CT (US); Victor V. Albert, New Haven, CT (US); Liang Jiang, Guilford, CT (US); Luigi Frunzio, North Haven, CT (US); Michel Devoret, New Haven, CT (US); Robert J. Schoelkopf, III, Madison, CT (US)

(73) Assignee: Yale University, New Haven, CT (US)

( * ) Notice: Subject to any disclaimer, the term of this patent is extended or adjusted under 35 U.S.C. 154(b) by 814 days.

(21) Appl. No.: 15/747,260

(22) PCT Filed: Jul. 22, 2016

(86) PCT No.: PCT/US2016/043514
§ 371 (c)(1),
(2) Date: Jan. 24, 2018

(87) PCT Pub. No.: WO2017/065856
PCT Pub. Date: Apr. 20, 2017

(65) Prior Publication Data
US 2019/0087743 A1 Mar. 21, 2019

Related U.S. Application Data

(60) Provisional application No. 62/196,611, filed on Jul. 24, 2015.

(51) Int. Cl.
*G06N 10/00* (2019.01)
*G06F 9/30* (2018.01)

(52) U.S. Cl.
CPC ......... *G06N 10/00* (2019.01); *G06F 9/30101* (2013.01)

(58) Field of Classification Search
CPC ..... G06N 10/00; G06N 99/00; G06F 9/30101
See application file for complete search history.

(56) References Cited

U.S. PATENT DOCUMENTS 6,578,018 B1 6/2003 Ulyanov
6,635,898 B2 10/2003 Williams et al.
(Continued)

FOREIGN PATENT DOCUMENTS

CN 1991558 A 7/2007
CN 101076957 A 11/2007
(Continued)

OTHER PUBLICATIONS

Egger, "Optimal Control and Quantum Simulations in Superconducting Quantum Devices," doctoral dissertation, U. Saarland (2014). (Year: 2014).*
(Continued)

*Primary Examiner* — Kamran Afshar
*Assistant Examiner* — Ryan C Vaughn
(74) *Attorney, Agent, or Firm* — Wolf, Greenfield & Sacks, P.C.

(57) ABSTRACT

Techniques are described in which a qubit is far off-resonantly, or dispersively, coupled to a quantum mechanical oscillator. In particular, a dispersive coupling between a physical qubit and a quantum mechanical oscillator may be selected such that control of the combined qubit-oscillator system can be realized. The physical qubit may be driven with an electromagnetic pulse (e.g., a microwave pulse) and the quantum mechanical oscillator simultaneously driven
(Continued)

with another electromagnetic pulse, the combination of which results in a change in state of the qubit-oscillator system.

24 Claims, 11 Drawing Sheets

(56) References Cited

U.S. PATENT DOCUMENTS

| | | | |
|---|---|---|---|
| 6,943,368 | B2 | 9/2005 | Amin et al. |
| 7,230,266 | B2 | 6/2007 | Hilton et al. |
| 7,498,832 | B2 | 3/2009 | Baumgardner et al. |
| 7,899,092 | B2 | 3/2011 | Malinovsky |
| 8,106,717 | B2 | 1/2012 | Ichimura et al. |
| 8,138,784 | B2 | 3/2012 | Przybysz et al. |
| 8,242,799 | B2 | 8/2012 | Pesetski et al. |
| 8,508,280 | B2 | 8/2013 | Naaman et al. |
| 8,514,478 | B1 | 8/2013 | Spence |
| 10,540,602 | B2 | 1/2020 | Heeres et al. |
| 10,776,709 | B2 | 9/2020 | Shen et al. |
| 11,106,991 | B2 | 8/2021 | Jiang et al. |
| 2002/0188578 | A1 | 12/2002 | Amin et al. |
| 2004/0109631 | A1 | 6/2004 | Franson et al. |
| 2004/0119061 | A1 | 6/2004 | Wu et al. |
| 2004/0200949 | A1 | 10/2004 | Beausoleil et al. |
| 2005/0240311 | A1 | 10/2005 | Rabitz |
| 2006/0017992 | A1 | 1/2006 | Beausoleil, Jr. et al. |
| 2006/0056631 | A1 | 3/2006 | Beausoleil et al. |
| 2009/0033369 | A1 | 2/2009 | Baumgardner et al. |
| 2012/0002968 | A1 | 1/2012 | Luo et al. |
| 2012/0319085 | A1 | 12/2012 | Gambetta et al. |
| 2012/0319684 | A1 | 12/2012 | Gambetta et al. |
| 2013/0196855 | A1 | 8/2013 | Poletto et al. |
| 2013/0308956 | A1 | 11/2013 | Meyers et al. |
| 2014/0266406 | A1 | 9/2014 | Abraham et al. |
| 2014/0314419 | A1 | 10/2014 | Paik |
| 2015/0263736 | A1 | 9/2015 | Herr et al. |
| 2016/0077168 | A1 | 3/2016 | Teklemariam et al. |
| 2016/0233965 | A1 | 8/2016 | Medford |
| 2016/0308502 | A1 | 10/2016 | Abdo et al. |
| 2016/0328659 | A1* | 11/2016 | Mohseni ............ H01L 39/223 |
| 2016/0364653 | A1 | 12/2016 | Chow et al. |
| 2017/0018312 | A1 | 1/2017 | Benjamin et al. |
| 2017/0076787 | A1* | 3/2017 | Frank ............ G11C 11/44 |
| 2017/0193388 | A1 | 7/2017 | Filipp et al. |
| 2017/0201224 | A1 | 7/2017 | Strong et al. |
| 2018/0032895 | A1 | 2/2018 | Jiang et al. |
| 2018/0247217 | A1 | 8/2018 | Heeres et al. |
| 2019/0266512 | A1 | 8/2019 | Shen et al. |

FOREIGN PATENT DOCUMENTS

| | | |
|---|---|---|
| CN | 101990742 A | 3/2011 |
| CN | 102210908 A | 10/2011 |
| CN | 102593694 A | 7/2012 |
| CN | 103582949 A | 2/2014 |
| CN | 103998965 A | 8/2014 |
| EP | 2 797 038 A2 | 10/2014 |
| JP | 2007-524815 A | 8/2007 |
| JP | 2018-511848 A | 4/2018 |
| WO | WO 2008/140290 A2 | 11/2008 |
| WO | WO 2016/138378 A1 | 9/2016 |
| WO | WO 2016/138399 A1 | 9/2016 |
| WO | WO 2017/151200 A1 | 9/2017 |
| WO | WO 2018/089850 A1 | 5/2018 |

OTHER PUBLICATIONS

Sheldon et al., "Procedure for Systematically Tuning up Cross-Talk in the Cross-Resonance Gate," in 93 Physical Rev. A 060302 (2016). (Year: 2016).*

Koch et al., "Charge-Insensitive Qubit Design Derived from the Cooper Pair Box," in 76 Physical Rev. A 042319 (2007). (Year: 2007).*

International Preliminary Report on Patentability for International Application No. PCT/US2017/061181 dated May 23, 2019.

U.S. Appl. No. 16/959,184, filed Jun. 30, 2020, Jiang et al.

PCT/US2019/012440, Jul. 16, 2020, International Preliminary Report on Patentability.

U.S. Appl. No. 15/553,047, filed Aug. 23, 2017, Jiang et al.

International Preliminary Report on Patentability for International Application No. PCT/US2019/012440, dated Jul. 16, 2020.

Ofek et al., Extending the lifetime of a quantum bit with error correction in superconducting circuits. Nature. Aug. 2016;536(7617):441.

Liu et al., Optical selection rules and phase-dependent adiabatic state control in a superconducting quantum circuit. Physical review letters. Aug. 17, 2005;95(8):087001.

Slighter et al., Measurement-induced qubit state mixing in circuit QED from up-converted dephasing noise. Physical Review Letters. Oct. 9, 2012;109(15):153601.

PCT/US2019/012440, Jul. 29, 2019, International Search Report and Written Opinion.

PCT/US2017/061181, May 23, 2019, International Preliminary Report on Patentability.

International Search Report and Written Opinion for International Application No. PCT/US2019/012440, dated Jul. 29, 2019.

Extended European Search Report dated Oct. 5, 2018 in connection with European Application No. 16756442.6.

Extended European Search Report for European Application No. 16756458.2 dated Nov. 12, 2018.

Extended European Search Report for European Application No. 16855886.4, dated Feb. 22, 2019.

Aharonov et al., Phase Change During a Cyclic Quantum Evolution, Phys. Rev. Lett. Apr. 20, 1987;58(16):1593-6.

Albert et al., Symmetries and conserved quantities in Lindblad master equations. Phys. Rev. A. Feb. 21, 2014;89(2):022118-1-14.

Andersson et al., Binary search trees for generalized measurements. Phys. Rev. A. May 6, 2008;77(5):052104-1-5.

Barreiro et al., An Open-System Quantum Simulator with Trapped Ions. Nature. Feb. 24, 2011;470:486-91.

Beige et al., Quantum Computing Using Dissipation to Remain in a Decoherence-Free Subspace. Phys. Rev. Lett. Aug. 21, 2000;85(8):1762-5.

Bianchetti et al., Dynamics of dispersive single qubit read-out in circuit quantum electrodynamics. Phys. Rev. A. Oct. 30, 2009;80(4):043840-1-7.

Blais et al., Cavity quantum electrodynamics for superconducting electrical circuits:An architecture for quantum computation. Phys. Rev. A. Jun. 29, 2004;69(6):062320-1-14.

Brattke et al., Generation of Photon Number States on Demand via Cavity Quantum Electrodynamics. Phys. Rev. Lett. Apr. 16, 2001;86(16):3534-7.

Braunstein et al., Quantum information with continuous variables. Rev. Mod. Phys. Apr. 2005;77, 513-77.

Burgath et al., Non-Abelian phases from quantum Zeno dynamics. Phys. Rev. A. Oct. 9, 2013;88(4), 042107-1-5.

Cacheffo et al., Quasi-perfect state transfer in abosonic dissipative network. J. Phys. B:At. Mol. Opt. Phys. May 5, 2010;43(10):105503.

Cafaro et al., Quantum stabilizer codes embedding qubits into qudits. Phys. Rev. A. Aug. 2012;86(2):022308.

Carollo et al., Coherent quantum evolution via reservoir driven holonomy. Phys. Rev. Lett. Jan. 20, 2006;96(2):020403-1-4.

Carollo et al., Geometric phase induced by a cyclically evolving squeezed vacuum reservoir. Phys. Rev. Lett. Apr. 21, 2006;96(15):150403-1-4.

Chaturvedi et al., Berry's phase for coherent states. J. Phys. A:Math. Gen. Nov. 11, 1987;20(16):L1071-5.

Choi, Completely positive linear maps on complex matrices. Linear Algebra and Its Applications. Jun. 1, 1975;10(3):285-90.

Dasgupta et al., Decoherence-induced geometric phase in a multilevel atomic system. J. Phys. B:At. Mol. Opt. Phys. May 14, 2007;40(9):S127.

(56) References Cited

OTHER PUBLICATIONS

De Oliveira et al., Properties of displaced number states. Phys. Rev. A. Mar. 1, 1990;41(5):2645-52.

De Ponte et al., Relaxation- and decoherence-free subspaces in networks of weakly and strongly coupled resonators. Ann. Phys. Sep. 2007;322(9):2077-84.

De Ponte et al., State protection under collective damping and diffusion. Phys. Rev. A. Jul. 26, 2011;84(1):012331-1-5.

De Ponte et al., Storing quantum states in bosonic dissipative networks. J. Phys. B:At. Mol. Opt. Phys. Nov. 14, 2008;41(21):215506.

Deléglise et al., Reconstruction of non-classical cavity field states with snapshots of their decoherence. Nature. Sep. 25, 2008;455(7212):510-4.

Devoret et al., Superconducting Circuits for Quantum Information:An Outlook. Science. Mar. 8, 2013;339(6124):1169-74.

Divincenzo, Quantum Computation. Science. Oct. 13, 1995;270(5234):255-61.

Dodonov et al., Even and Odd Coherent States and Excitations of a Singular Oscillator. Physica. Mar. 15, 1974;72(3):597-615.

Duan et al., Preserving coherence in quantum computation by pairing the quantum bits. Phys. Rev. Lett. Sep. 8, 1997;79(10):1953-6.

Facchi et al., Quantum Zeno Subspaces. Physical Review Letters. Aug. 19, 2002;89(8):080401-1-4.

Feng et al., Geometric Entangling Gates in Decoherence-Free Subspaces with Minimal Requirements. Phys. Rev Lett. Nov. 13, 2009;103(20):200501-1-4.

Fouquieres et al., Second order gradient ascent pulse engeineering. J. Mag. Res. Oct. 2011;212(2):412-7.

Gambetta et al., Qubit-photon intereactions in a cavity:Measurement-induced dephasing and number splitting. Phys. Rev. A. Oct. 17, 2006;74(4):042318-1-14.

Gorini et al., Completely positive dynamical semigroups of N-level systems. J. Math. Phys. May 1976;17(5):821-5.

Gottesman et al., Encoding a qubit in an oscillator. Phys. Rev. A. Jul. 2001;64(1):012310-1-21.

Heeres et al., Cavity State Manipulation Using Photon-Number Selective Phase Gates. Phys Rev Lett Sep. 25, 2015;115(13):137002-1-5. arXiv:1503.01496v1.

Hofheinz et al., Generation of Fock states in a superconducting quantum circuit. Nature. Jul. 17, 2008;454(7202):310-4.

Hofheinz et al., Synthesizing arbitrary quantum states in a superconducting resonator. Nature. May 28, 2009;459(7246):546-9.

Houck et al., Generating single microwave photons in a circuit. Nature. Sep. 20, 2007;449(7160):328-31.

Johnson et al., Quantum non-demolition detection of single microwave photons in a circuit. Nature Phys. Jun. 20, 2010;6:663-7.

Kapit, Error-Transparent Quantum Gates for Small Logical Qubit Architectures. Physical Review Letters. Feb. 1, 2018;120(5):050503-1-5.

Kempe et al., Theory of decoherence-free fault-tolerant universal quantum computation. Phys. Rev. A. Apr. 2001;63(4):042307-1-29.

Kirchmair et al., Observation of quantum state collapse and revival due to the single-photon Kerr effect. Nature. Mar. 14, 2013;495(7440):205-9.

Knill et al., Theory of Quantum Error Correction for General Noise. Phys. Rev, Lett. Mar. 13, 2000;84(11):2525-8.

Krastanov et al., Universal Control of an Oscillator with Dispersive Coupling to a Qubit. Phys. Rev. A. Oct. 21, 2015;92(4):040303-1-5.

Lanyon et al., Universal Digital Quantum Simulation with Trapped Ions. Science. Oct. 7, 2011;334(6052):57-61.

Law et al., Arbitrary Control of a Quantum Electromagnetic Field. Phys. Rev. Lett. Feb. 12, 1996;76(7):1055-8.

Leek et al., Observation of Berry's Phase in a Solid-State Qubit. Science. Dec. 21, 2007;318(5858):1889-92.

Leghtas et al., Confining the state of light to a quantum manifold by engineered two-photon loss. Science. Feb. 20, 2015;347(6224):853-7.

Leghtas et al., Deterministic protocol for mapping a qubit to coherent state superpositions in a cavity. Phys. Rev. A. Apr. 15, 2013;87(4):042315-1-7.

Leghtas et al., Hardware-Efficient Autonomous Quantum Memory Protection. Phys Rev Lett. Sep. 20, 2013;111(12):120501-1-5.

Leibfried et al., Quantum dynamics of single trapped ions. Rev. Mod. Phys. Jan. 2003;75(1):281-324.

Liang et al., Nonadiabatic holonomic quantum computation in decoherence-free subspaces with trapped ions. Phys. Rev. A. Jun. 10, 2014;89(6):062312-1-5.

Lidar et al., Decoherence Free Subspaces for Quantum Computation. Phys. Rev. Lett. Sep. 21, 1998;81(12):2594-7.

Lindblad, On the Generators of Quantum Dynamical Semigroups. Commun. Math. Phys. Jun. 1976;48(2):119-30.

Lloyd et al., Quantum Computation over Continuous Variables. Phys. Rev. Lett. Feb. 22, 1999;82(8):1784-7.

Michael et al., New Class of Quantum Error-Correcting Codes for Bosonic Mode, Phys. Rev. X. Jul.-Sep. 2016:6(3):031006-1-26.

Mirrahimi et al., Dynamically protected cat-qubits:a new paradigm for universal quantum computation. New Journal of Physics. Apr. 2014;16(4):045014. doi:10.1088/1367-2630/16/4/045014. 30 pages.

Mischuck et al., Qudit quantum computation in the Jaynes-Cumming model. Phys. Rev. A. Feb. 2013;87(2):022341-1-14.

Mousolou et al., Universal non-adiabatic holonomic gates in quantum dots and single-molecule magnets. New J. Phys. Jan. 17, 2014;16:013029.

Neto et al., From decoherence-free channels to decoherence-free and quasi-free subspaces within bosonic dissipative networks. J. Phys. B:At. Mol. Opt. Phys. Jul. 5, 2011,44(14):145502.

Nigg et al., Quantum computations on a topolgically encoded qubit. Science. Jul. 18, 2014;345(6194):302-5.

Oreshkov et al., Adiabatic Markovian Dynamics. Phys. Rev. Lett. Jul. 30, 2010;105(5):050503.

Oreshkov et al., Fault-Tolerant Holonomic Quantum Computation. Phys. Rev. Lett. Feb. 20, 2009;102(7):070502-1-4.

Osaki et al., Derivation and physical interpretation of the optimum detection operators for coherent-state signals. Phys. Rev. A. Aug. 1996;54(2):1691-1701.

Pachos et al., Decoherence-free dynamical and geometrical entangling phase gates. Phys. Rev. A Mar. 26, 2004;69(3):033817-1-9.

Palomaki et al., Coherent state transfer between itinerant microwave fields and a mechanical oscillator. Nature. Mar. 14, 2013. 495(7440):210-4.

Paz-Silva et al., Zeno effect for quantum computation and control. Physical Review Letters. Feb. 24, 2012;108(8):080501-1-5.

Poyatos et al., Quantum Reservoir Engineering with Laser Cooled Trapped Ions. Phys. Rev. Lett. Dec. 2, 1996;77(23):4728-31.

Reagor et al., Reaching 10 ms single photon lifetimes for superconducting aluminum cavities. Appl. Phys. Lett. May 13, 2013:102(19):192604.

Recati et al., Holonomic quantum computation with neutral atoms. Physical Review A. Sep. 17, 2002;66(3):032309-1-13. doi:10.1103/PHYSREVA.66.032309. 14 pages.

Reiserer et al., A quantum gate between a flying optical photon and a single trapped atom. Nature. Apr. 10, 2014;508(7495):237-40.

Rosenblum et al., Fault-tolerant measurement of a quantum error syndrome. Science. Jul. 20, 2018;361(6399):266-70.

Salathe et al., Digital Quantum Simulation of Spin Models with Circuit Quantum Electrodynamics. Phys. Rev. X 5. Apr.-Jun. 2015;5(2):021027-1-12.

Sarandy et al., Abelian and non-Abelian geometric phases in adiabatic open quantum systems. Phys. Rev. A. Jun. 5, 2006;73(6):062101-1-10.

Schindler et al., Quantum simulation of open-system dynamical maps with trapped ions. Nat. Phys. May 19, 2013;9:361-7.

Schoelkopf et al., Wiring up quantum systems. Nature. Feb. 7, 2008;451(7179):664-9.

Schuster et al., Resolving photon number states in a superconducting circuit. Nature Letters. Feb. 1, 2007;445:515-8.

Shankar et al., Autonomously stabilized entanglement between two superconducting quantum bits. Nature. Dec. 19, 2013;504(7480):419-22.

(56) References Cited

OTHER PUBLICATIONS

Shen et al., Quantum channel construction with circuit quantum electrodynamics. Phys Rev B. Apr. 1, 2017;95(13):134501-1-14. arXiv:1611.03463.

Signoles et al., Confined quantum Zeno dynamics of a watched atomic arrow. Nature Phys. Oct. 2014;10:715-9.

Sjöqvist, A new phase in quantum computation. Physics. Nov. 17, 2008;1:35.

Smolin et al., Efficient Method for Computing the Maximum-Likelihood Quantum State from Measurements with Additive Gaussian Noise. Phys. Rev. Lett. Feb. 17, 2012;108(7):070502-1-4.

Tiecke et al., Nanophotonic quantum phase switch with a single atom. Nature. Apr. 10, 2014;508(7495):241-4.

Vlastakis et al., Deterministically Encoding Quantum Information Using 100-Photon Schrodinger Cat States. Science. Nov. 1, 2013;342(6158):607-10.

Vourdas, Quantum systems with finite Hilbert space. Rep. Prog. Phys. Mar. 2004:67(3):267-320.

Wallraff et al., Strong coupling of a single photon to a superconducting qubit using circuit quantum electrodynamics. Nature. Sep. 9, 2004;431(7005):162-7.

Whitney et al., Automated generation of layout and control for quantum circuits. CF '07 Proceedings of the 4th International Conference on Computing Frontiers. May 7-9, 2007:83-94.

Wilczek et al., Appearance of Gauge Structure in Simple Dynamical Systems. Phys. Rev. Lett. Jun. 10, 1984;52(24):2111-4.

Wu et al., Holonomic Quantum Computation in Decoherence-Free Subspaces. Phys. Rev. Lett. Sep. 25, 2005:95(13):130501-1-4.

WU et al., Time-dependent Decoherence-Free Subspace. J. Phys. A:Math. Theor. Oct. 12, 2012;45(40):405305-1-7.

Xu et al., Non-Adiabatic Holonomic Quantum Computation in Decoherence-Free Subspaces. Phys. Rev, Lett. Oct. 26, 2012;109(17):170501-1-5.

Xu et al., Universal Nonadiabatic Geometric Gates in Two-Qubit Decoherence-Free Subspaces. Sci. Rep. Oct. 29, 2014;4:6814.

Yin et al., Implementation of holonomic quantum computation through engineering and manipulating environment. Physical Review A. Dec. 18, 2007;76(6):062311-1-5. doi:10.1103/Physreva.76.062311.

Zanardi et al., Coherent quantum dynamics in steady-state manifolds of strongly dissipative systems. Phys. Rev. Lett. Dec. 12, 2014;113(24):240406-1-5.

Zanardi et al., Geometry, robustness, and emerging unitarity in dissipation-projected dynamics. Phys. Rev. A. May 26, 2015;91(5):052324-1-8.

Zanardi et al., Holonomic Quantum Computation. Phys. Lett. A. Dec. 20, 1999;264(2-3), 94-9.

Zanardi et al., Noiseless Quantum Codes. Phys. Rev. Lett. Oct. 27, 1997;79(17):3306-9.

Zanardi, Stablizing Quantum Information. Phys. Rev. A. Jan. 2001;63(1):012301-1-4.

Zanardi, Virtual Quatum Subsystems. Phys. Rev. Lett. Aug. 13, 2001;87(7):077901-1-4.

Zhang et al., Physical implementation of holonomic quantum computation in decoherence-free subspaces with trapped ions. Phys. Rev. A. Sep. 13, 2006;74(3):034302-1-4.

Zhang et al., Quantum computation in noiseless subsystems with fast non-Abelian holonomies. Phys. Rev. A. Apr. 2014;89(4):042302-1-6.

Zheng, Dissipation-induced geometric phase for an atom trapped in an optical vacity. Phys. Rev. A. May 10, 2012;85(5):052106-1-5.

Zheng, Open-system geometric phase based on system-reservoir joint state evolution. Phys. Rev. A. Jun. 27, 2014;89(6):062118-1-6.

Zhu et al., Geometric quantum gates robust against stochastic control errors. Phys. Rev. A. Aug. 15, 2005;72(2):020301-1-4.

International Search Report and Written Opinion for International Application No. PCT/US2016/019769 dated May 5, 2016.

International Preliminary Report on Patentability for International Application No. PCT/US2016/019769 dated Sep. 8, 2017.

International Search Report and Written Opinion for International Application No. PCT/US2016/019807 dated May 2, 2016.

International Preliminary Report on Patentability for International Application No. PCT/US2016/019807 dated Sep. 8, 2017.

International Search Report and Written Opinion for Application No. PCT/US2016/43514 dated May 23, 2017.

International Preliminary Report on Patentability for Application No. PCT/US2016/043514 dated Feb. 8, 2018.

Invitation to Pay Additional Fees for International Application No. PCT/US2017/061181 dated Dec. 22, 2017.

International Search Report and Written Opinion for International Application No. PCT/US2017/061181 dated Feb. 23, 2018.

Wendin et al., Superconducting quantum circuits, qubits and computing. Aug. 30, 2005. http://qudev.phys.ethz.ch/content/courses/QSIT08/pdfs/WendinReview.pdf, 60 pages.

Zueco et al., Qubit-oscillator dynamics in the dispersive regime: analytical theory beyond rotating wave approximation. Physical Review A. Jul. 20, 2009:80.3;1-6.

Extended European Search Report for European Application No. 17869543.3, dated Jun. 9, 2020.

Lloyd et al., Engineering quantum dynamics. Phys Rev A. Dec. 10, 2001;65(1):010101.

U.S. Appl. No. 16/348,131, filed May 7, 2019, Shen.

EP16756442.6, Oct. 5, 2018, Extended European Search Report.

EP16756458.2, Nov. 12, 2018, Extended European Search Report.

EP16855886.4, Feb. 22, 2019, Extended European Search Report.

Fisher et al., Optimal control of circuit quantum electrodynamics in one and two dimensions. Physical Review B, Feb. 23, 2010;81(8):085328.

Extended European Search Report for European Application No. 19751562.0, dated Aug. 17, 2021.

Gao et al., Entanglement of bosonic modes through an engineered exchange interaction. Nature. Feb. 27, 2019:566:509-12.

Lau et al., Universal quantum computing with arbitrary continuous-variable encoding. Physical review letters. Aug. 31, 2016;117(10):100501.

Patel et al., A quantum Fredkin gate. Science advances. Mar. 1, 2016;2(3):e1501531.

Rosenblum et al., A CNOT gate between multiphoton qubits encoded in two cavities. Nature communications. Feb. 13, 2018;9(1):1-6.

\* cited by examiner

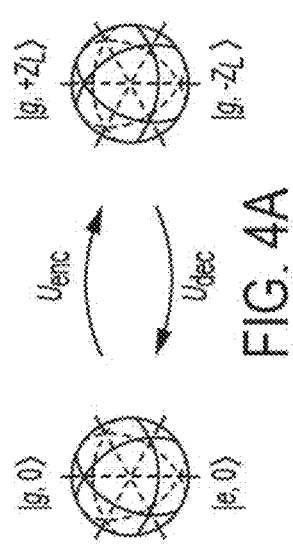
FIG. 4A
FIG. 4B
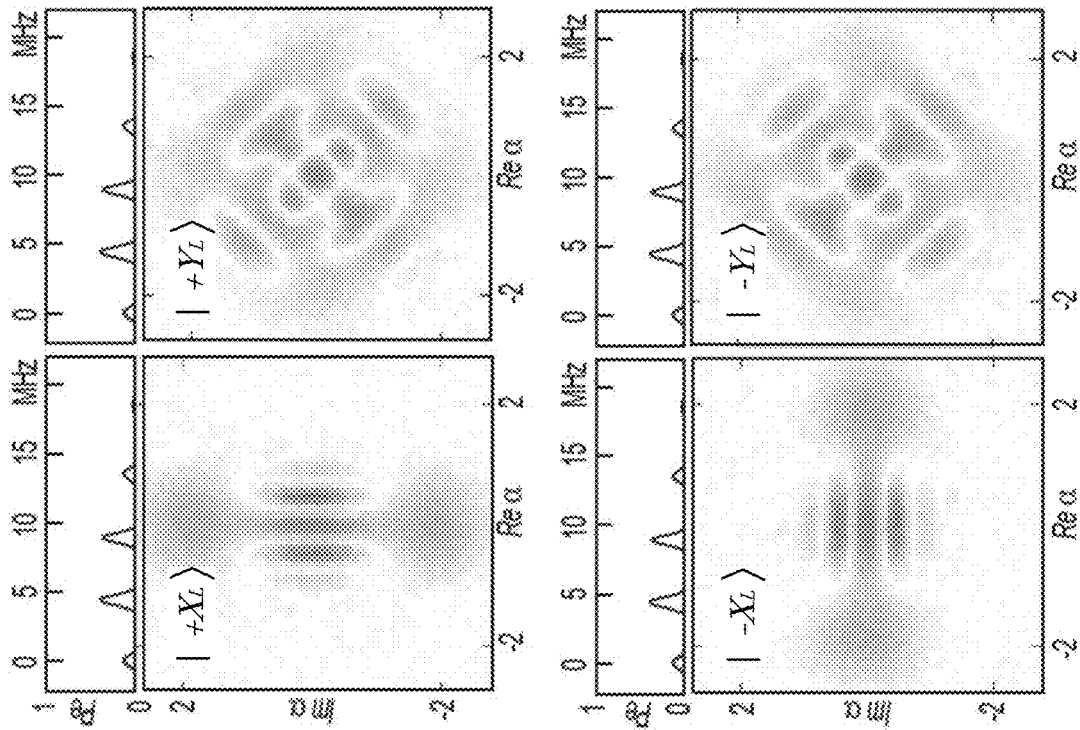
FIG. 4D
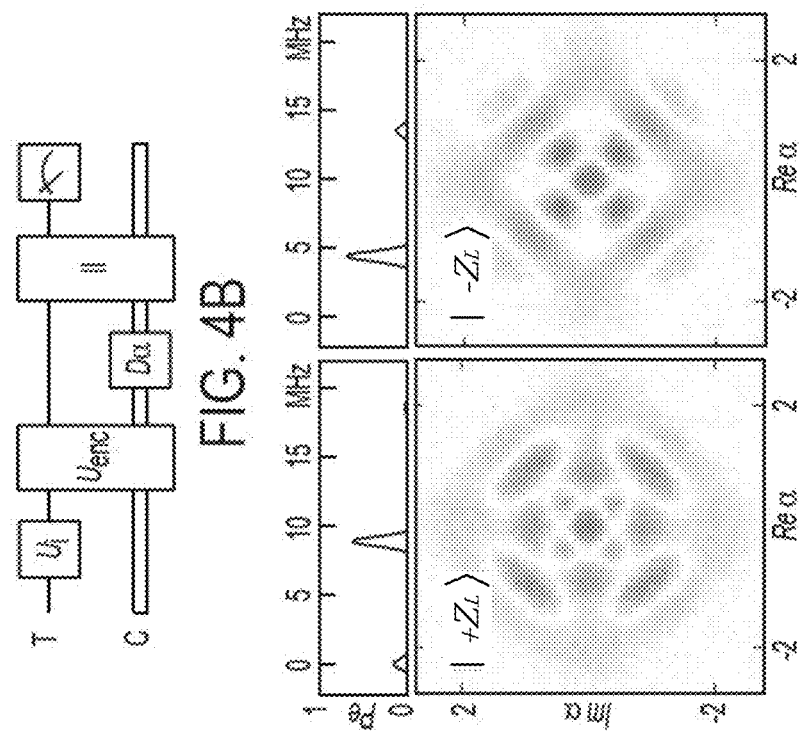
FIG. 4C

TECHNIQUES OF OSCILLATOR STATE MANIPULATION FOR QUANTUM INFORMATION PROCESSING AND RELATED SYSTEMS AND METHODS

CROSS-REFERENCE TO RELATED APPLICATIONS

This application is the national phase filing under 35 U.S.C. § 371 of International Application No. PCT/US2016/043514, filed on Jul. 22, 2016, which claims priority to U.S. Provisional Patent Application No. 62/196,611, filed on Jul. 24, 2015, each of which are incorporated herein by reference to the maximum extent allowable.

STATEMENT REGARDING FEDERALLY-SPONSORED RESEARCH AND DEVELOPMENT

This invention was made with U.S. Government support under Grant No. W911NF-14-1-0011 awarded by the U.S. Army Research Office. The U.S. Government may have certain rights in this invention.

BACKGROUND

The ability to prepare and control the quantum state of a quantum system is important for quantum information processing. Just as a classical computer memory should have the ability to initialize bits and implement gates to change the state of a bit from zero to one and vice versa, a quantum computer should be able to initialize the state of the quantum system used to store quantum information and the quantum system should be able to be controlled to implement logical gates that change the quantum state of the quantum system.

Quantum information may be stored in any of a variety of quantum mechanical systems. Conventionally, quantum information may be stored using quantum bits, referred to as "qubits," which are typically two-state quantum mechanical systems. However, many-state quantum systems, such as quantum mechanical oscillators, may also be used to store quantum information.

SUMMARY

Some aspects are directed to a method of operating a circuit quantum electrodynamics system that includes a physical qubit dispersively coupled to a quantum mechanical oscillator, the method comprising applying a first drive waveform to the quantum mechanical oscillator, and applying a second drive waveform to the physical qubit concurrent with the application of the first drive waveform, wherein the first and second drive waveforms are configured to produce a state transition of the circuit quantum electrodynamics system from an initial state to a final state.

According to some embodiments, the physical qubit is in a ground state in the initial and final states of the circuit quantum electrodynamics system, and the quantum mechanical oscillator has a different photon number state in the final state of the circuit quantum electrodynamics system than in the initial state of the circuit quantum electrodynamics system.

According to some embodiments, the physical qubit has a state in the final state of the circuit quantum electrodynamics system that depends upon a photon number state of the quantum mechanical oscillator in the initial state of the circuit quantum electrodynamics system.

According to some embodiments, the physical qubit is in a ground state in the initial state of the circuit quantum electrodynamics system, and the physical qubit is in either the ground state or in an excited state in the final state of the circuit quantum electrodynamics system.

According to some embodiments, the method further comprises determining the first and second drive waveforms by optimizing a fidelity of the state transition of the circuit quantum electrodynamics system.

According to some embodiments, optimizing the fidelity of the state transition of the circuit quantum electrodynamics system comprises a gradient optimization technique.

According to some embodiments, the first and second drive waveforms are selected, based on the initial state and the final state, from a computer readable medium storing a plurality of previously determined drive waveforms.

According to some embodiments, the state transition is a unitary state change.

According to some embodiments, the quantum mechanical oscillator is a microwave cavity.

According to some embodiments, the physical qubit is a transmon qubit.

According to some embodiments, the dispersive coupling between the physical qubit and the quantum mechanical oscillator has a dispersive shift $\chi$, and a duration of each of the first and second drive waveforms is less than four times $1/\chi$.

According to some embodiments, the duration of each of the first and second drive waveforms is less than 1 microsecond.

According to some embodiments, the application of the first drive waveforms begins at substantially the same time as the application of the second drive waveform begins, and the application of the first drive waveforms ends at substantially the same time as the application of the second drive waveform ends.

According to some embodiments, a plurality of photon number states of the quantum mechanical oscillator are selected as a multi-qubit register, and the first and second drive waveforms are configured to perform a multi-qubit operation upon the multi-qubit register.

Some aspects are directed to a system, comprising a circuit quantum electrodynamics system that includes a physical qubit dispersively coupled to a quantum mechanical oscillator, at least one computer readable medium storing a plurality of drive waveforms, each of the plurality of drive waveforms being associated with an initial state of the circuit quantum electrodynamics system and a final state of the circuit quantum electrodynamics system, at least one controller configured to select a first drive waveform and a second drive waveform from amongst the stored plurality of drive waveforms based at least in part on a final state of the circuit quantum electrodynamics system and the final states associated with the selected first and second drive waveforms, and at least one electromagnetic radiation source configured to apply the first drive waveform to the quantum mechanical oscillator, and apply the second drive waveform to the physical qubit concurrent with the application of the first drive waveform.

According to some embodiments, each of the plurality of drive waveforms is configured based at least in part on a desired state transition of the circuit quantum electrodynamics system from the initial state associated with the drive waveform to the final state associated with the drive waveform.

According to some embodiments, the plurality of drive waveforms include a first group of drive waveforms configured to be applied to the quantum mechanical oscillator and a second group of drive waveforms configured to be applied to the physical qubit.

According to some embodiments, the desired state transition is a unitary state change.

According to some embodiments, the quantum mechanical oscillator is a microwave cavity.

According to some embodiments, the physical qubit is a transmon qubit.

According to some embodiments, the dispersive coupling between the physical qubit and the quantum mechanical oscillator has a dispersive shift $\chi$, and wherein a duration of each of the first and second drive waveforms is less than four times $1/\chi$.

According to some embodiments, the at least one controller is further configured to cause the at least one electromagnetic radiation source to begin application of the first and second drive waveforms at substantially the same time, and end application of the first and second drive waveforms at substantially the same time.

According to some embodiments, a duration of each of the first and second drive waveforms is less than 1 microsecond.

The foregoing apparatus and method embodiments may be implemented with any suitable combination of aspects, features, and acts described above or in further detail below. These and other aspects, embodiments, and features of the present teachings can be more fully understood from the following description in conjunction with the accompanying drawings.

BRIEF DESCRIPTION OF DRAWINGS

Various aspects and embodiments will be described with reference to the following figures. It should be appreciated that the figures are not necessarily drawn to scale. In the drawings, each identical or nearly identical component that is illustrated in various figures is represented by a like numeral. For purposes of clarity, not every component may be labeled in every drawing.

FIGS. 4A-4D illustrate encoding of a cat state qubit, according to some embodiments;

DETAILED DESCRIPTION

Figure 1:
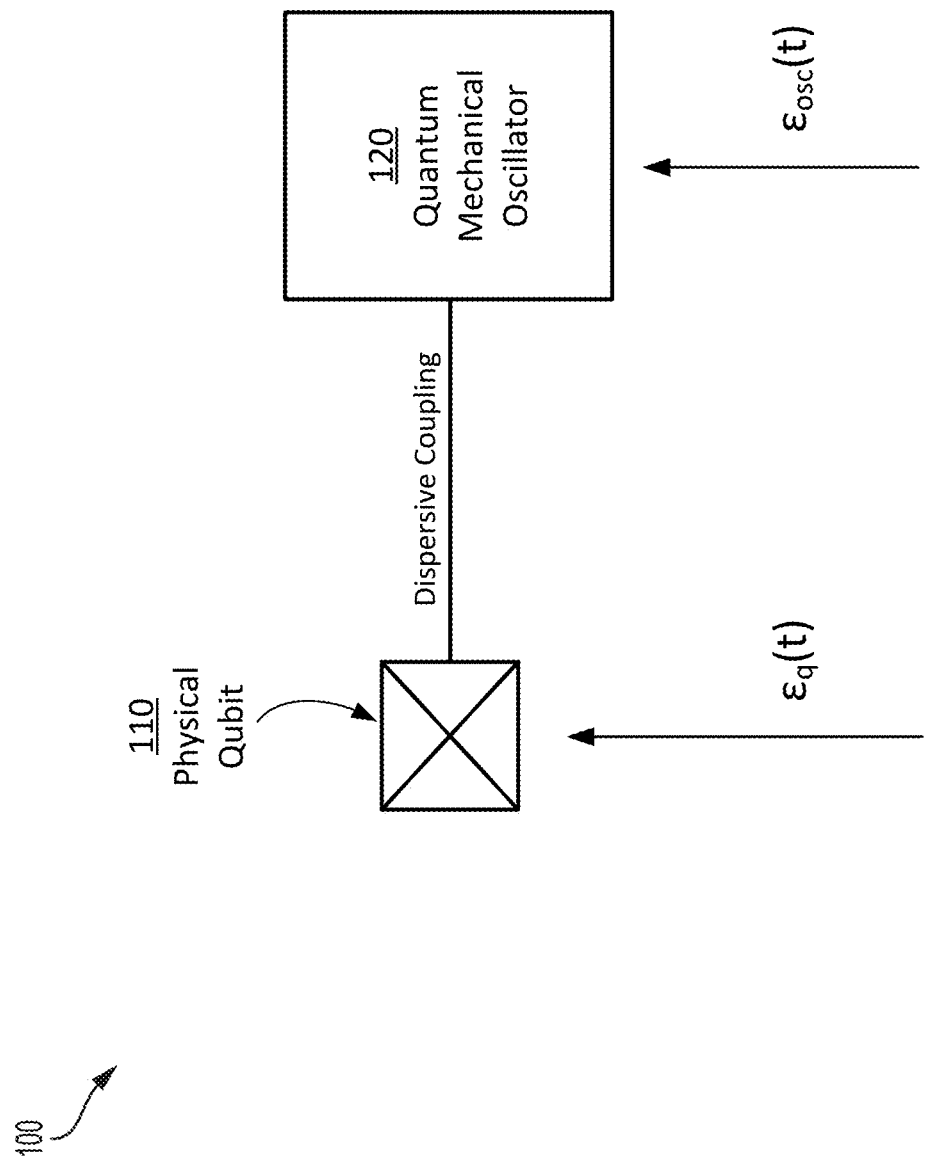
FIG. 1 is a block diagram of a circuit quantum electrodynamics system, according to some embodiments.

Conventional quantum information processing schemes couple a number of two-level quantum systems (i.e., "qubits") to encode information. However, quantum information tends to be fragile and susceptible to noise and decoherence processes. Thus, error-correction protocols are frequently employed with a goal of prolonging the amount of time for which quantum information may be reliably stored.

Some quantum error-correction protocols utilize a single logical qubit built from a collection of physical qubits. For instance, the quantum state $|\psi\rangle$, of a logical qubit may be represented by a superposition of the two states, $|0\rangle$ and $|1\rangle$. e.g., $|\psi\rangle = \alpha|0\rangle + \beta|1\rangle$, where $\alpha$ and $\beta$ are complex numbers representing the probability amplitude of the logical qubit being in state $|0\rangle$ and $|1\rangle$, respectively. In some error correction schemes, the quantum state of the logical qubit may be encoded physically in a plurality of physical qubits, such as by entangling three physical qubits in a state with the same probability amplitudes as the logical qubit: $|\psi\rangle = \alpha|000\rangle + \beta|111\rangle$, which represents the entangled quantum state of three physical qubits.

Other quantum error-correction schemes utilize a quantum mechanical oscillator to encode a bit of quantum information, since such oscillators tend to exhibit longer decoherence times than qubits built from, say, Josephson junctions. Such oscillators have a linear energy spectrum, however, making quantum control of the oscillator's state difficult due to the resulting degeneracy of state transitions. Conventionally, a qubit may be resonantly coupled to the quantum mechanical oscillator, which produces a combined system that has a controllable nonlinearity.

The inventors have recognized and appreciated that there are advantages to forming a system in which a qubit is far off-resonantly, or dispersively, coupled to a quantum mechanical oscillator. In particular, a dispersive coupling between a physical qubit and a quantum mechanical oscillator may be selected such that control of the combined qubit-oscillator system can be realized. The physical qubit may be driven with an electromagnetic pulse (e.g., a microwave pulse) and the quantum mechanical oscillator simultaneously driven with another electromagnetic pulse, the combination of which results in a change in state of the qubit-oscillator system.

The inventors have analytically demonstrated that a suitable combination of electromagnetic pulses (hereinafter, "pulses") separately applied to a physical qubit and to a quantum mechanical oscillator to which the qubit is coupled may produce any arbitrary unitary operation on the oscillator, and thereby provide for universal control. This determination was made under a constraint that the qubit and oscillator were not driven at the same time. However, while this analysis produces techniques for universal control, the constraint causes substantive operations on the oscillator to require application of a long series of pulses to the qubit and the oscillator, which limits the number of operations that are feasible in the presence of decoherence of the system.

Accordingly, even if the fidelity of the operations is very high or even perfect, decoherence of the system over the period during which the operations are applied may nonetheless result in a less than desirable fidelity in the aggregate.

The inventors have recognized and appreciated that by relaxing the constraint that the qubit and oscillator are driven separately, pulse waveforms that produce desired system state changes can be determined via the use of numerical techniques. The inventors have identified numerical techniques that can determine pulse waveforms which, when applied to the system, produce very high fidelity state transitions in much less time than would have been required under the constrained approach described above.

According to some embodiments, the pulse waveforms can be determined ahead of time for a particular combination of initial system state and final system state. Then, when the system is in a particular initial state and a target final state is desired, pulse waveforms can be selected from a library of preprepared pulse waveforms and applied to the qubit and the oscillator to transition the system from the initial state to the target final state.

According to some embodiments, pulses may be simultaneously applied to a physical qubit and to a quantum mechanical oscillator to which the qubit is coupled, thereby producing a change in the state of the qubit-oscillator system. In some cases, the pulses may be applied to the qubit and the oscillator for the same amount of time and/or may be applied during the same time period (i.e., with both pulses beginning and ending at substantially the same time).

According to some embodiments, pulses applied to a physical qubit and to a quantum mechanical oscillator may cause a change in a photon number state of the oscillator. In at least some cases, the state of the qubit may change also.

According to some embodiments, pulses applied to a physical qubit and to a quantum mechanical oscillator may cause a change in state of the qubit that depends upon the state of the oscillator. In particular, the inventors have recognized and appreciated that the state of the oscillator may be mapped onto the state of the qubit via particular pulse waveforms applied to the qubit and to the oscillator. Thus, by observing the change in the state of the qubit as a result of application of these pulses, information about the state of the oscillator may be determined. In at least some cases, the state of the qubit may be measured to determine information about the state of the oscillator without substantially changing the state of the oscillator. Thus, certain pulse waveforms are to be used as tools to measure a state of the qubit-oscillator system. In other cases, measuring the state of the qubit to determine information about the state of the oscillator causes a back-action that changes the state of the oscillator.

According to some embodiments, a state of the oscillator may be treated as a multi-qubit register by considering the binary representation of its photon number states. For example, the $|5\rangle$ photon number state of the oscillator may be viewed as the $|101\rangle$ state of a 3-qubit register. Particular types of pulses that may be applied to the qubit and to the oscillator may produce a change in state of the qubit that depends upon the state of a particular "bit" of this multi-qubit register. For example, a pair of pulses applied to the qubit and to the oscillator, respectively, when the qubit is in the ground state, may transition the qubit from the ground state to an excited state when the least significant bit of the multi-qubit register is equal to 1, whereas application of the same pulses may result in the qubit remaining in the ground state when the least significant bit of the register is equal to 0. Pulse waveforms may be determined and applied to the qubit and to the oscillator to read any one or more of any bits of an n-bit multi-qubit register. In some cases, a pulse applied to the qubit and to the oscillator may be configured to measure the X value of a quantum bit in the register, corresponding to determining whether the state is $|0\rangle + |1\rangle$ or $|0\rangle - |1\rangle$; that is, determining the phase of the coherent superposition.

Accordingly, by determining pulse waveforms via numerical techniques as described herein, the state of the oscillator (whether acting as a multi-qubit register or otherwise) can be both determined and manipulated to a desired target state, thereby providing universal control of the oscillator.

Following below are more detailed descriptions of various concepts related to, and embodiments of, techniques for controlling the state of a quantum mechanical system. It should be appreciated that various aspects described herein may be implemented in any of numerous ways. Examples of specific implementations are provided herein for illustrative purposes only. In addition, the various aspects described in the embodiments below may be used alone or in any combination, and are not limited to the combinations explicitly described herein.

FIG. 1 is a block diagram of a circuit quantum electrodynamics system, according to some embodiments. System 100 includes a physical qubit 110 and a quantum mechanical oscillator 120. In the example of FIG. 1, the qubit and the oscillator are dispersively coupled—that is, the qubit-oscillator detuning is much larger (e.g., an order of magnitude larger) than the coupling strength between the qubit and the oscillator. An electromagnetic signal $\varepsilon_q(t)$ may be applied to the physical qubit 110 and an electromagnetic signal $\varepsilon_{osc}(t)$ may be applied to the quantum mechanical oscillator 120. Generally in the discussion below, application of such an electromagnetic signal or pulse may also be referred to as "driving" of the qubit or oscillator.

In the example of FIG. 1, the state of the oscillator 120 may be represented by a superposition of components, each component comprising an excitation number eigenstate (also known as a Fock state), $|n\rangle$ and a corresponding probability amplitude, $c_n$:

$$|\psi\rangle_{osc.} = \Sigma_{n=0}^{\infty} c_n |n\rangle. \tag{Eqn. 1}$$

According to some embodiments, the quantum mechanical oscillator 120 may comprise a resonator cavity, such as a microwave cavity. In such embodiments, the system 100 may be described using the Hamiltonian:

$$H(t) = H_{cavity} + H_{qubit} + H_{interaction} + H_{drive}(t) \tag{Eqn. 2}$$

$$H_{cavity} = \omega_c \hat{a}^\dagger \hat{a} + \frac{K}{2}(\hat{a}^\dagger)^2 \hat{a}^2 \tag{Eqn. 3}$$

$$H_{qubit} = \omega_q \hat{b}^\dagger \hat{b} + \frac{\alpha}{2}(\hat{b}^\dagger)^2 \hat{b}^2 \tag{Eqn. 4}$$

$$H_{interaction} = \chi \hat{a}^\dagger \hat{a} \hat{b}^\dagger \hat{b} + \frac{\chi'}{2} \hat{b}^\dagger \hat{b}(\hat{a}^\dagger)^2 \hat{a}^2 \tag{Eqn. 5}$$

$$H_{drive}(t) = \varepsilon_C(t)\hat{a} + \varepsilon_T(t)\hat{b} + \text{(Hermitian conjugate)} \tag{Eqn. 6}$$

where $\chi$ is a dispersive shift of the dispersive coupling between the cavity and the qubit, the annihilation operator corresponding to the cavity and qubit modes is denoted by $\hat{a}$ or $\hat{b}$, respectively. $\omega_c$ is a fundamental frequency of the cavity, $\omega_q$ is the transition frequency of the qubit, K is the cavity anharmonicity (due to the Kerr effect), and $\alpha$ is the transmon anharmonicity.

As discussed above, drive waveforms $\varepsilon_q(t)$ and $\varepsilon_{osc}(t)$ may be determined via numerical techniques for a particular desired state change of the system 100. In particular, suitable drive waveforms may be determined that allow $\varepsilon_q(t)$ and $\varepsilon_{osc}(t)$ to be applied simultaneously to the physical qubit and the oscillator, respectively. The drive waveforms $\varepsilon_q(t)$ and $\varepsilon_{osc}(t)$ may be applied during the same time period (i.e., may start and end together) or may simply overlap in time.

Figure 2:
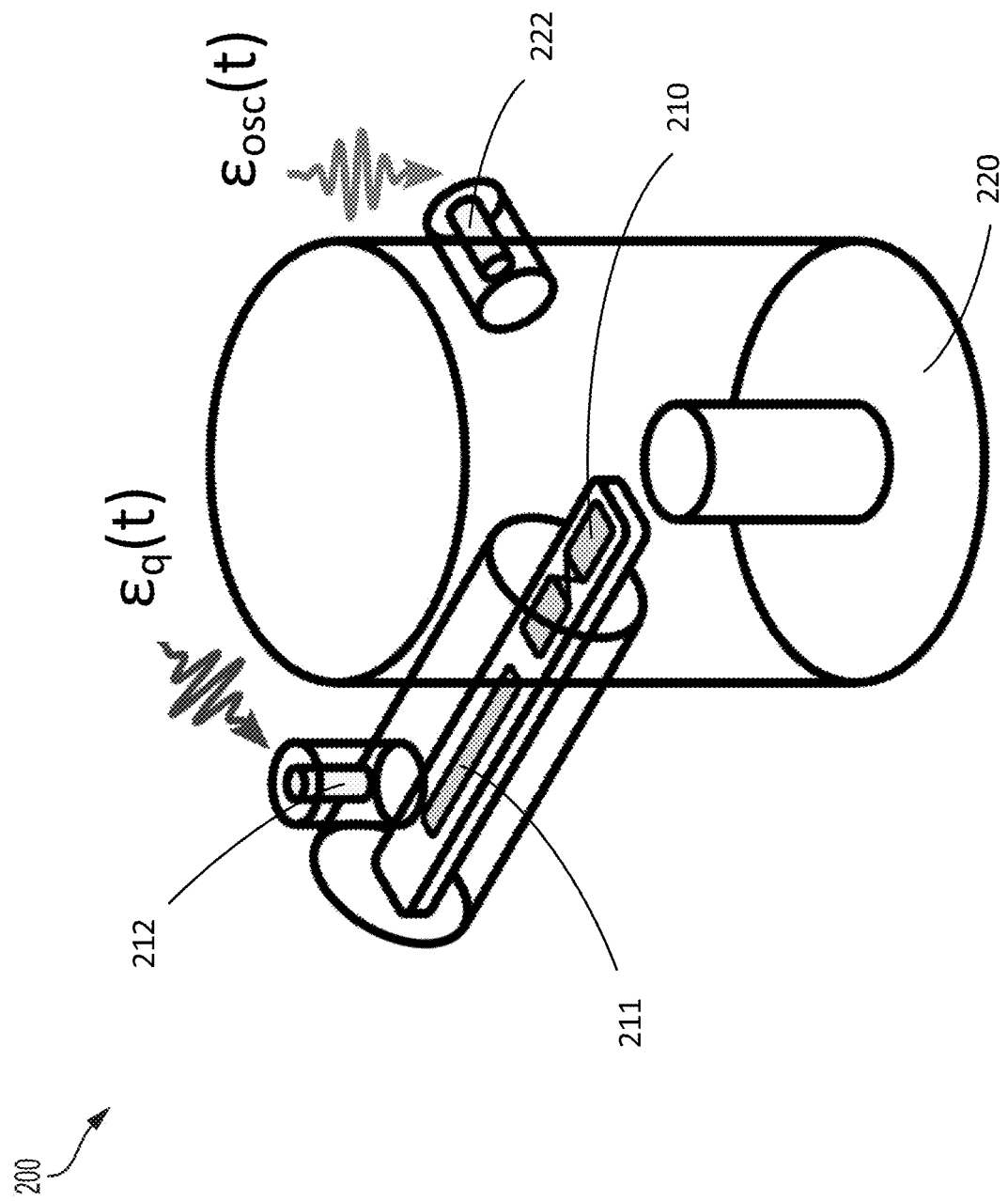
FIG. 2 is a schematic drawing of an illustrative circuit quantum electrodynamics system, according to some embodiments.

FIG. 2 is a schematic drawing of an illustrative circuit quantum electrodynamics system, according to some embodiments. System 200 is an example of system 100 shown in FIG. 1, including a transmon qubit 210 and a cavity resonator 220. In the example of FIG. 2, the cavity resonator 220 is a $\lambda/4$ coax-stub cavity resonator coupled to the transmon 210 and to a read-out resonator 211. Input couplers (ports) 212 and 222 deliver the time dependent microwave drive signals $\varepsilon_q(t)$ and $\varepsilon_{osc}(t)$, respectively. The transmon may be dispersively coupled to the cavity with a dispersive shift of between −1 MHz and −4 MHz, such as between −3 MHz and −2 MHz, such as −2.2 MHz. According to some embodiments, the microwave drive signals may be full in-phase/quadrature (IQ) modulated microwave fields centered on either the fundamental frequency of the cavity (when being input to port 222) or the transition frequency of the qubit (when being input to port 212).

Figure 3A:
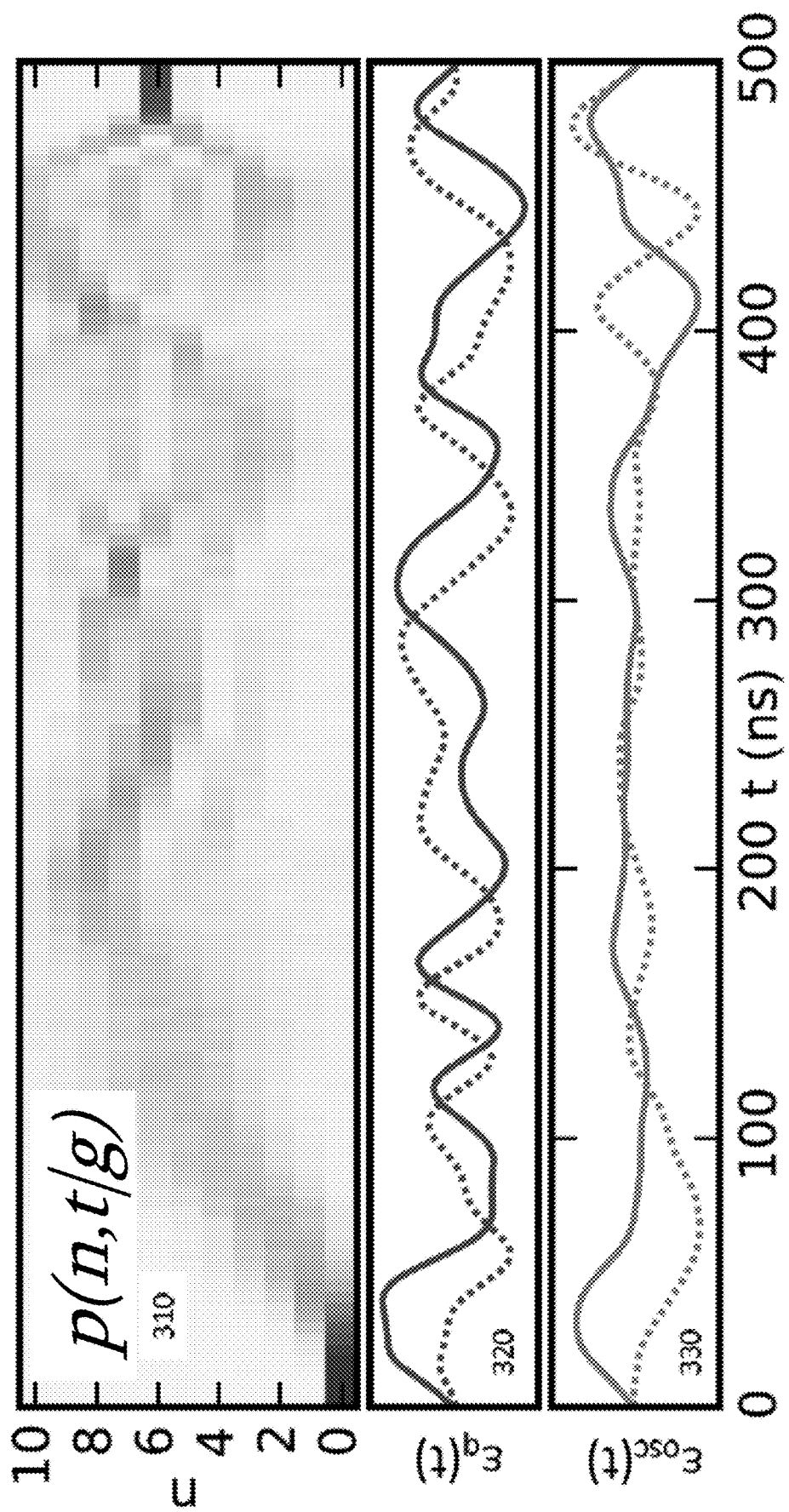
FIG. 3A illustrates a change in photon number state of a quantum mechanical oscillator when the illustrated drive waveforms are applied to the oscillator and to a physical qubit to which it is coupled, according to some embodiments.

FIG. 3A illustrates a change in photon number state of a quantum mechanical oscillator when the illustrated drive waveforms are applied to the oscillator and to a physical qubit to which it is coupled, according to some embodiments. The example of FIG. 3A illustrates the evolution of a quantum mechanical system such as system 100 shown in FIG. 1 or system 200 shown in FIG. 2 when drive signals $\varepsilon_q(t)$ and $\varepsilon_{osc}(t)$ are applied concurrently to a physical qubit and a quantum mechanical oscillator, respectively. At least one aspect of the change in state of the system in question as a result of the application of the drive signals shown is to transition the number state of the oscillator from the $|0\rangle$ state to the $|6\rangle$ state, as discussed below.

In the example of FIG. 3A, a number state of the oscillator is represented in graph 310 at a series of times over the 500 ns period during which the drive signals $\varepsilon_q(t)$ and $\varepsilon_{osc}(t)$ are applied. In graph 310, the probability that a measurement of the system would produce a measurement of a respective number state is represented by different shades of gray, with darker gray or black representing a high probability of the particular number state being measured and lighter grays representing low probabilities.

Graph 320 shows the drive waveform $\varepsilon_q(t)$ applied to the qubit of the system and graph 330 shows the drive waveform $\varepsilon_{osc}(t)$ applied to the oscillator of the system in the example of FIG. 3A. The solid lines represent an in-phase field component of the drive signal whereas the dotted lines represent a quadrature field component of the drive signal.

In the system's initial state (at time t=0 shown in FIG. 3A), the number state of the oscillator is $|0\rangle$ as shown by a very dark gray block at t=0 and n=0. In the system's final state (at time t=500 ns shown in FIG. 3A), the number state of the oscillator is $|6\rangle$ as shown by a very dark gray block at t=500 ns and n=6. At intermediate times during application of the drive waveforms, the number state of the oscillator is generally a superposition of several number states.

Note that while the particular state of the oscillator between the initial state (t=0) and the final state (t=500 ns) of the system may not be known, this has no direct effect on the use of the drive pulses to transition the system from the $|0\rangle$ state to the $|6\rangle$ state. That is, the drive waveforms shown in the example of FIG. 3A have been determined based on the criteria that the current number state of the oscillator is $|0\rangle$ and the target final state of the oscillator after application of the pulses is $|6\rangle$. The numerical techniques to be described below allow this type of determination so that the system can be transitioned from an initial to final state so long as a suitable waveform for the particular pair of states has been determined.

While FIG. 3A is an example of manipulating the number state of the oscillator in a quantum mechanical system, the changes in the state of such a system that may be effected by concurrent application of drive signals to a qubit and to an oscillator to which the qubit is dispersively coupled are not limited to this type of manipulation. As discussed below, one other type of system state change may be to produce a qubit state that is dependent upon the state of the oscillator. This is merely one additional example, however. The numerical techniques described herein allow constraints about the initial and final state of the qubit-oscillator system to be provided as input to the calculation such that shapes of the drive signals $\varepsilon_q(t)$ and $\varepsilon_{osc}(t)$ cause the state transition as defined by the constraints to be output from the calculation. As such, the types of qubit-oscillator state changes that can be produced is not limited to any particular type of state change described herein, as the numerical techniques are not so limited.

Figure 3B:
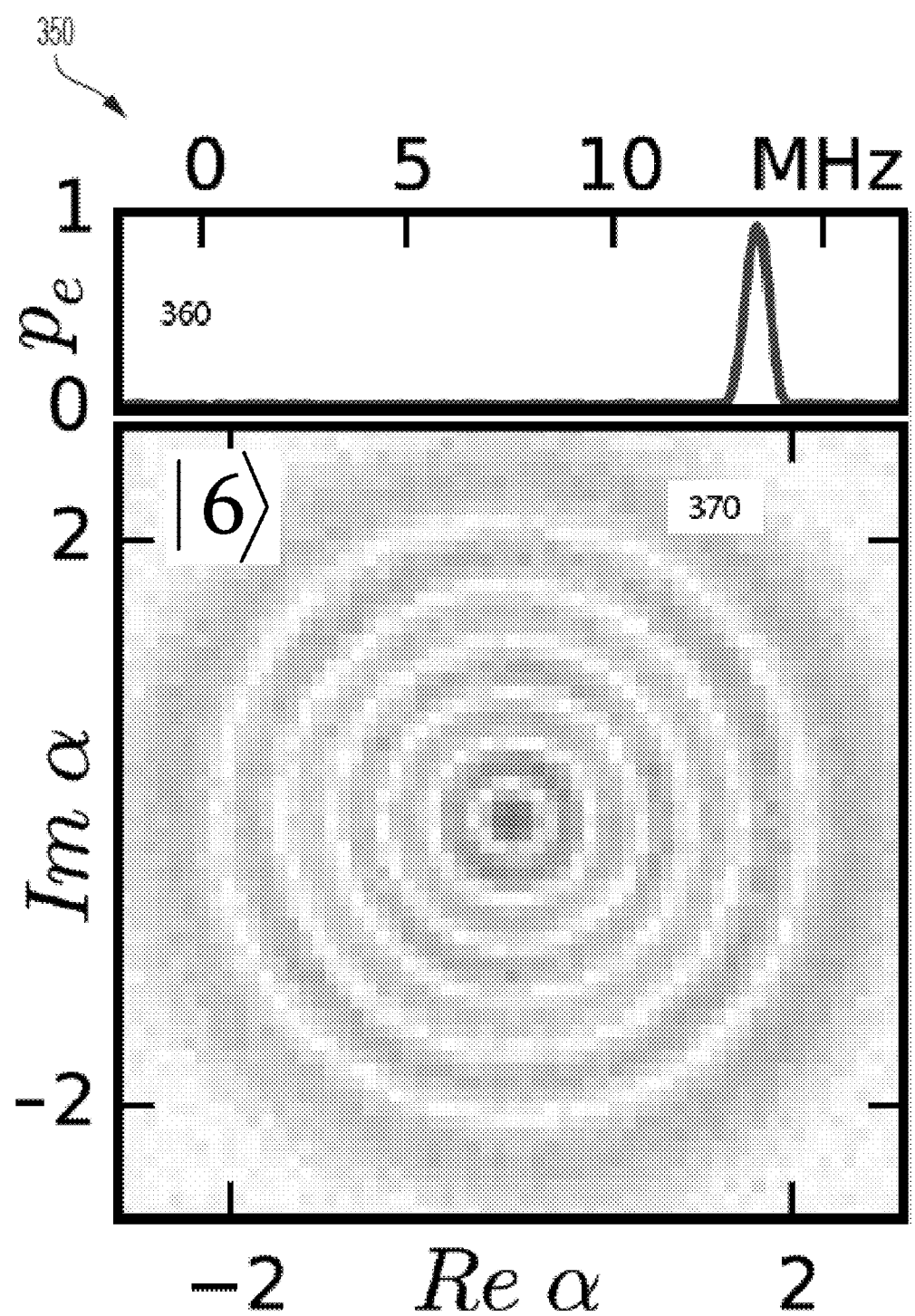
FIG. 3B illustrates a characterization of the state of the oscillator after the change in photon number state shown in FIG. 3A, according to some embodiments.

FIG. 3B illustrates a characterization of the state of the oscillator after the change in photon number state shown in FIG. 3A, according to some embodiments. FIG. 3B includes graph 360 which illustrates a spectroscopic view of the qubit after producing the transition to the $|6\rangle$ state shown in FIG. 3A. As can be seen in graph 360, the power is concentrated around 13 MHz, which in the example of FIG. 3B is approximately equal to six times the dispersive shift $\chi$ of the qubit-oscillator coupling (i.e. $\chi \approx 2.2$ MHz). Graph 370 shown in FIG. 3B illustrates Wigner tomography of the oscillator state after transition to the $|6\rangle$ state as shown in FIG. 3A.

FIGS. 4A-4C illustrate encoding of a cat state qubit, according to some embodiments. FIG. 4A illustrates operations $U_{enc}$ and $U_{dec}$ which may be used to coherently map between two distinct two-dimensional subspaces, represented by Bloch spheres. The first subspace (left of FIG. 4A) consists of a transmon qubit's ground and excited states, $|g\rangle$ and $|e\rangle$, respectively, with a cavity to which the transmon qubit is coupled in the vacuum state. The second subspace (right of FIG. 4B), is given by the oscillator-encoded states $|+Z_L\rangle$ and $|-Z_L\rangle$.

FIG. 4B illustrates a sequence of operations that may be applied to the transmon qubit (labeled "T") and/or to the cavity to which the qubit is coupled (labeled "C"). A transmon state is prepared by applying an initial rotation $U_i$ and is then mapped to the cavity via the encoding operation $U_{enc}$. A cavity displacement $D_\alpha$ is then applied to the cavity following a parity mapping operation $\Pi$ that provides for measurement of the cavity Wigner function $W(\alpha)$. The parity mapping operation Π may be implemented by determining a suitable drive waveform using the numerical techniques described herein.

As shown in FIG. 4C, applying $U_{enc}$ to the transmon states $|g\rangle$ and $|e\rangle$ produces states whose Wigner functions are consistent with the encoded basis states given by four-component cat states:

$$|+Z_L\rangle = \frac{1}{N}(|\alpha\rangle + |i\alpha\rangle + |-\alpha\rangle + |-i\alpha\rangle)$$

$$= \frac{1}{N}\sum_n \frac{\alpha^{4n}}{\sqrt{(4n)!}}|4n\rangle$$

$$|-Z_L\rangle = \frac{1}{N}(|\alpha\rangle - |i\alpha\rangle + |-\alpha\rangle - |-i\alpha\rangle)$$

$$= \frac{1}{N}\sum_n \frac{\alpha^{4n+2}}{\sqrt{(4n+2)!}}|4n+2\rangle$$

A transmon spectroscopy experiment (top panels, showing probability densities for each number state of the cavity) illustrates that only photon number states with n=0 mod 4 (n=2 mod 4) are present for logical state $|+Z_L\rangle$ ($|-Z_L\rangle$).

As shown in FIG. 4D, applying $U_{enc}$ to superpositions of the transmon basis states demonstrates that the relative phase is preserved and that $U_{enc}$ is a faithful map between the transmon and logical qubit Bloch spheres. These states, on the equator of the Bloch sphere, are equally weighted superpositions of $|+Z_L\rangle$ and $|-Z_L\rangle$, and therefore contain all even photon numbers present in the basis states.

Figure 5:
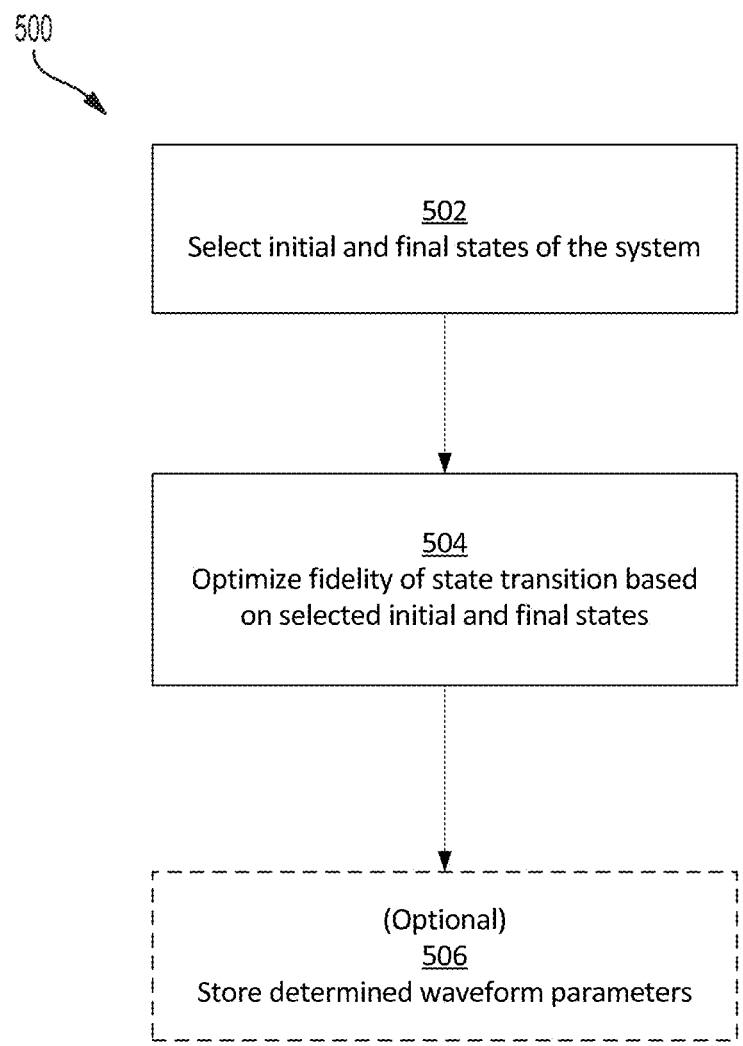
FIG. 5 is a flowchart of a method of determining drive waveforms to be applied to a circuit quantum electrodynamics system to produce a desired change in the state of the system, according to some embodiments.

FIG. 5 is a flowchart of a method of determining drive waveforms to be applied to a circuit quantum electrodynamics system to produce a desired change in the state of the system, according to some embodiments. In method 500, numerical techniques are applied based on the Hamiltonian of the quantum system in question (e.g., system 100 shown in FIG. 1 or system 200 shown in FIG. 2) with added constraints (one or more of which constrain the final state of the system) to numerically determine the parameters of drive waveforms that can produce a system transition that respects the constraints.

Based on Equation 2 above, the capacity of known decoherence sources to impact the fidelity of operations on the system can be simulated using a Markovian Lindblad master equation of the form:

$$\frac{\partial}{\partial t}\rho(t) = \quad \text{(Eqn. 7)}$$

$$\frac{i}{\hbar}[H(t),\rho(t)] + \left(\frac{1}{T_{1,C}}D[\hat{a}] + \frac{1}{T_{1,T}}D[\hat{b}] + \frac{1}{T_\phi}D[\hat{b}^\dagger\hat{b}]\right)(\rho(t))$$

$$D[a](\rho) = a\rho a^\dagger - \frac{1}{2}\{a^\dagger a, \rho\} \quad \text{(Eqn. 8)}$$

In the above equations and in the example described below, it is assumed for the sake of example that the qubit of the system is a transmon qubit and the oscillator is a resonating cavity. Non-limiting, illustrative values for the system parameters in the above equations are shown in Table 1, below.

| Description | Hamiltonian Term | Illustrative Value |
|---|---|---|
| Transmon frequency | $\omega_T \hat{b}^\dagger \hat{b}$ | 5663.9 MHz |
| Cavity frequency | $\omega_C \hat{a}^\dagger \hat{a}$ | 4452.5 MHz |
| Dispersive shift | $\chi \hat{a}^\dagger \hat{a} \hat{b}^\dagger \hat{b}$ | −2.2 MHz |
| Transition anharmonicity | $\frac{\alpha}{2}(\hat{b}^\dagger)^2 \hat{b}^2$ | −236 MHz |
| Cavity anharmonicity (Kerr) | $\frac{K}{2}(\hat{a}^\dagger)^2 \hat{a}^2$ | −3.7 kHz |
| Second order dispersive shift | $\frac{\chi'}{2}(\hat{a}^\dagger)^2 \hat{a}^2 \hat{b}^\dagger \hat{b}$ | −17.7 kHz |
| Transmon relaxation | $\frac{1}{T_1}D[\hat{b}]$ | 170 μs |
| Transition excitation | $\frac{1}{T_\uparrow}D[\hat{b}^\dagger]$ | — |
| Transition dephasing | $\frac{1}{T_\phi}D[\hat{b}^\dagger \hat{b}]$ | 43 μs |
| Cavity relaxation | $\frac{1}{T_{cav}}D[\hat{a}]$ | 2.7 ms |
| Cavity dephasing | $\frac{1}{T_{\phi,cav}}D[\hat{a}^\dagger \hat{a}]$ | — |

According to some embodiments, operations on the quantum system performed via the drive waveforms applied to the qubit and to the oscillator may be defined in terms of a set of simultaneous state transfers. That is, an operation, for each i, takes an initial state of the system $|\psi_{init}^{(i)}\rangle$ to a final system state $|\psi_{final}^{(i)}\rangle$. In act 502 of method 500, these initial and final states may be selected.

In order to prepare a desired operation on the joint cavity-transmon Hilbert space, numerical techniques can be used to maximize the (coherent) average fidelity of these state transfers over the drive waveforms $\varepsilon(t) \equiv (\varepsilon_C(t), \varepsilon_T(t))$:

$$\underset{\varepsilon(t)}{\text{maximize}} \mathcal{F}(\varepsilon(t)) \text{ where} \quad \text{(Eqn. 9)}$$

$$\mathcal{F}(\varepsilon(t)) = \left|\sum_i \langle \psi_{final}^{(i)}|U(T,\varepsilon(t))|\psi_{init}^{(i)}\rangle\right|^2, \quad \text{(Eqn. 10)}$$

and where the unitary U defined by the waveforms $\varepsilon(t)$ is given by the time-ordered exponential of the Hamiltonian up to some final time T, $$U(T,\varepsilon(t)) = \mathcal{T}\exp(-\int_0^T dt H(\varepsilon(t))). \quad \text{(Eqn. 11)}$$

In act 504 of method 500, the optimization of Equation 9 is performed to determine the drive waveforms $\varepsilon(t) \equiv (\varepsilon_C(t), \varepsilon_T(t))$ based on the initial and final states selected in act 502. The optimization may be performed using any suitable numerical technique(s), as the present disclosure is not limited to any particular numerical technique or techniques.

According to some embodiments, $\varepsilon(t)$ may be represented by a set of parameters that characterize the drive waveforms. For instance, the drive waveforms may be represented by parametric curves and the parameters of the curves optimized within the context of Equation 9 to determine the shape of the drive waveforms. According to some embodiments, $\varepsilon(t)$ may be represented as a piecewise constant function with N=T/Δt steps of length Δt (e.g., Δt=2 ns), corresponding to a time resolution of the waveform generation process.

$$U(T, \varepsilon(t)) = U_N U_{N-1} \ldots U_2 U_1 \quad \text{(Eqn. 12)}$$

$$U_k = \exp\left(\frac{i\Delta t}{\hbar} H(\varepsilon(k\Delta t))\right) \quad \text{(Eqn. 13)}$$

For example, using 4 parameters per time point (for the real and imaginary components of each of the cavity and transmon drive waveforms) and N=550 time points representing a 1.1 μs pulse, there would be 2200 parameters over which to optimize.

The optimization problem of Equation 9 may, in at least some cases, produce multiple solutions of ε(t) that achieve equally high fidelities when applied to the quantum system. As such, in some embodiments, additional constraints upon the system may be applied by adding additional terms to Equation 9:

$$\underset{\varepsilon(t)}{\text{maximize}} \mathcal{F}(\varepsilon(t)) - \sum_i \lambda_i g_i(\varepsilon(t)) \quad \text{(Eqn. 14)}$$

where the constraints $g_i$ are each multiplied by a Lagrange multiplier $\lambda_i$. Accordingly, in act 504, Equation 14 may be optimized as an alternative to optimization of Equation 9 to determine the drive waveforms. While any number and type of suitable constraints $g_i$ may be used within Equation 14, some examples are described below.

One illustrative constraint that may be included in Equation 14 enforces an upper limit on the amount of amplitude that may be applied with the drive pulses, i.e., that $\varepsilon(t) \leq \varepsilon_{max}$ for all t. This constraint may be written as:

$$g_{amplitude}(\varepsilon(t)) = \int dt (|\varepsilon(t)| - \varepsilon_{max})^2 \Theta(|\varepsilon(t)| - \varepsilon_{max})$$

$$= \sum_n (|\varepsilon(n\Delta t)| - \varepsilon_{max})^2 \Theta(|\varepsilon(n\Delta t)| - \varepsilon_{max})$$

Additionally, or alternatively, an illustrative constraint that may be included in Equation 14 may be designed to minimize the bandwidth of the applied pulses (e.g., because interactions between the electromagnetic source of the pulses and the quantum system become more uncertain as the pulses move away from resonance). This constraint may be applied via the following "penalty term" in Equation 14:

$$g_{derivative}(\varepsilon(t)) = \int dt \left(\frac{\partial \varepsilon(t)}{\partial t}\right)^2$$

Additionally, or alternatively, an illustrative constraint that may be included in Equation 14 may be to enforce a hard cutoff on the minimum and maximum frequencies allowed in the solution. For example, Equation 14 may be reparametrized in terms of the Fourier transform of the pulses and conditions that the drive signals are equal to zero above and below the maximum and minimum frequencies may be applied. The fidelity may then be maximized with respect to the Fourier transform of the pulses.

Any one or more of the constraints above and/or any other constraints may be applied in Equation 14, as the above are merely provided as illustrative examples.

In order to optimize Equations 9 or 14 in a numerically tractable manner, it may be necessary to adapt the equation in light of the infinite-dimensional nature of the Hilbert space. That is, since computer memory is finite, vectors or matrices of infinite length cannot be represented without truncation or otherwise representing the vector or matrix in a finite form. As such, act 504 may include such a step of truncation or other manipulation of vectors or matrices of infinite length.

According to some embodiments, Equation 14 may be adapted in light of the infinite Hilbert space by choosing a photon number truncation N such that the operator a becomes a N×N matrix. When we do this, we are in effect replacing our infinite-dimensional oscillator with a finite-dimensional qudit. This replacement is only valid if all of the system dynamics relevant for the desired state transfers occurs within the $\{|0\rangle, \ldots, |N-1\rangle\}$ subspace. For generic applied drives this is not the case; however, such an approach may naturally fit with some approaches described herein (see FIGS. 7A-7D and FIG. 8 described below) or may otherwise apply in some embodiments.

In order to enforce this property, the optimization problem of Equation 14 can be modified to find a solution that operates identically under several different values of N. Writing the fidelity as computed with a truncation N as $\mathcal{F}_N$, we have:

$$\underset{\varepsilon(t)}{\text{maximize}} \left(\sum_k \mathcal{F}_{N+k}(\varepsilon(t))\right) - \left(\sum_i \lambda_i g_i(\varepsilon(t))\right) \quad \text{(Eqn. 15)}$$

Furthermore, to enforce that the behavior is identical in the different truncations, the following penalty term can be included in Equation 15:

$$g_{discrepancy}(\varepsilon(t)) = \sum_{k_1 \neq k_2} (\mathcal{F}_{N+k_1}(\varepsilon(t)) - \mathcal{F}_{N+k_2}(\varepsilon(t)))^2 \quad \text{(Eqn. 16)}$$

The constraint of Equation 16 ensures that the determined fidelity of a space of size N is equal to the determined fidelity of a space of size N+1, and to the determined fidelity of a space of size N+2, etc.

According to some embodiments, the choice of a value of N may, at least in part, determine a maximum photon number population that can be produced by a pulse, and/or may determine, at least in part, a minimum time necessary to complete the operation in question (e.g., faster pulses may be achieved with a higher value of N). The approach of Equation 15, coupled with the constraint of Equation 16, ensures that the truncation point does not affect the end result of the determined pulse waveforms.

Irrespective of which of Equations 9, 14 and 15 is optimized to determine the pulse waveforms, the optimization may use any suitable numerical techniques, including any nonlinear optimization techniques. According to some embodiments, the numerical techniques may include one or more gradient descent methods, including but not limited to, Broyden-Fletcher-Goldfarb-Shannon (BFGS).

Figure 6:
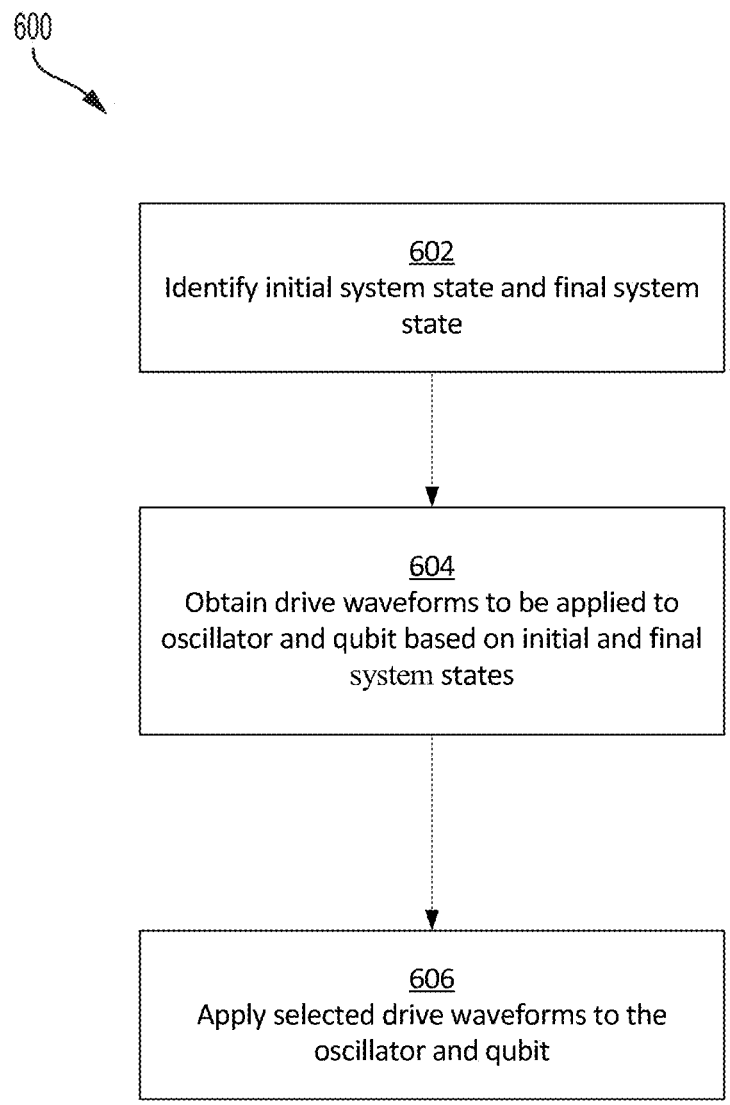
FIG. 6 is a flowchart of a method of selecting and applying drive waveforms to a circuit quantum electrodynamics system, according to some embodiments.

Once drive waveforms have been determined via the above-described process or otherwise in method 500, the waveforms may be optionally stored in a suitable computer readable medium for later retrieval (506). According to some embodiments, method 500 may be performed a number of times for various combinations of initial and final system states and the waveforms determined for each combination stored in one or more computer readable media. As such, a "library" of pulse waveforms may be produced so that any desired system state transition can be produced by retrieving and applying pulse waveforms that will produce the desired transition. FIG. 6 is a flowchart illustrating such a method of selecting and applying drive waveforms to a circuit quantum electrodynamics system, according to some embodiments.

Method 600 may be performed within any suitable quantum mechanical system such as system 100 shown in FIG. 1 or system 200 shown in FIG. 2. In act 602, an initial system state and a target system state are identified. According to some embodiments, at least part of the initial system state may be identified via application of pulse waveforms to the system as described in relation to FIGS. 7A-7D and FIG. 8 below.

According to some embodiments, the initial and final system states may include information about states of the qubit, the oscillator, or both the qubit and the oscillator. For instance, the initial system state may include a known photon number state of the oscillator yet may not include any known state of the qubit (that is, in some cases the state of the qubit may be irrelevant to the initial state for a particular system transition). As another example, the initial system state may include only a known state of the qubit. As another example, the final system state may include information about a state of the qubit and information about the state of the oscillator.

In act 604, drive waveforms are selected based on the initial and final system states identified in act 602. As discussed above, in some embodiments drive waveforms may be precomputed and stored in one or more computer readable media. In such cases, act 604 may comprise a lookup into the media using the initial and final states as a lookup key. In some embodiments, act 604 may comprise calculation of part or all of the drive waveforms based on the initial and final states identified in act 602 (e.g., via the techniques discussed in relation to FIG. 5).

In act 606, the drive waveforms obtained in act 604 are applied concurrently to the oscillator and qubit of the system as described above in relation to FIGS. 1 and 2.

As discussed above, certain pulses applied to a physical qubit and to a quantum mechanical oscillator may cause a change in state of the qubit that depends upon the state of the oscillator. Thus, by observing the change in the state of the qubit as a result of application of these pulses, information about the state of the oscillator may be determined. As such, certain pulse waveforms may be used as tools to measure a state of the qubit-oscillator system.

To illustrate one example of pulses that perform such a measurement technique, FIGS. 7A-7D illustrate results of applying selected drive pulses to a circuit quantum electrodynamics system (e.g., system 100 shown in FIG. 1 or system 200 shown in FIG. 2) in order to perform measurement of a quantum mechanical oscillator. In the examples of FIGS. 7A-7D, the oscillator is being treated as a multi-qubit register. That is, since the photon number levels can be manipulated as discussed above, this state can be used to store multiple bits of information by viewing the state as a binary value. For example, when treating the oscillator as a two qubit register, the number states 0, 1, 2 and 3 may be viewed as storing the binary values 00, 01, 10 and 11, respectively. The oscillator may be viewed as a multi-qubit register having any suitable bit depth.

FIGS. 7A-7D illustrate results of applying pulse waveforms to a qubit and an oscillator to which the qubit is dispersively coupled, thereby measuring the parity of each bit of the oscillator's number state value. In the example of FIGS. 7A-7D, the qubit is initially in the ground state (e.g., may be driven to ground or otherwise) and pulse waveforms are applied to the qubit and oscillator. These pulse waveforms have been produced via the numerical techniques described above such that the measured state of the qubit after application of the pulses indicates the parity of a particular bit of the oscillator when treated as a multi-qubit register.

Figure 7A:
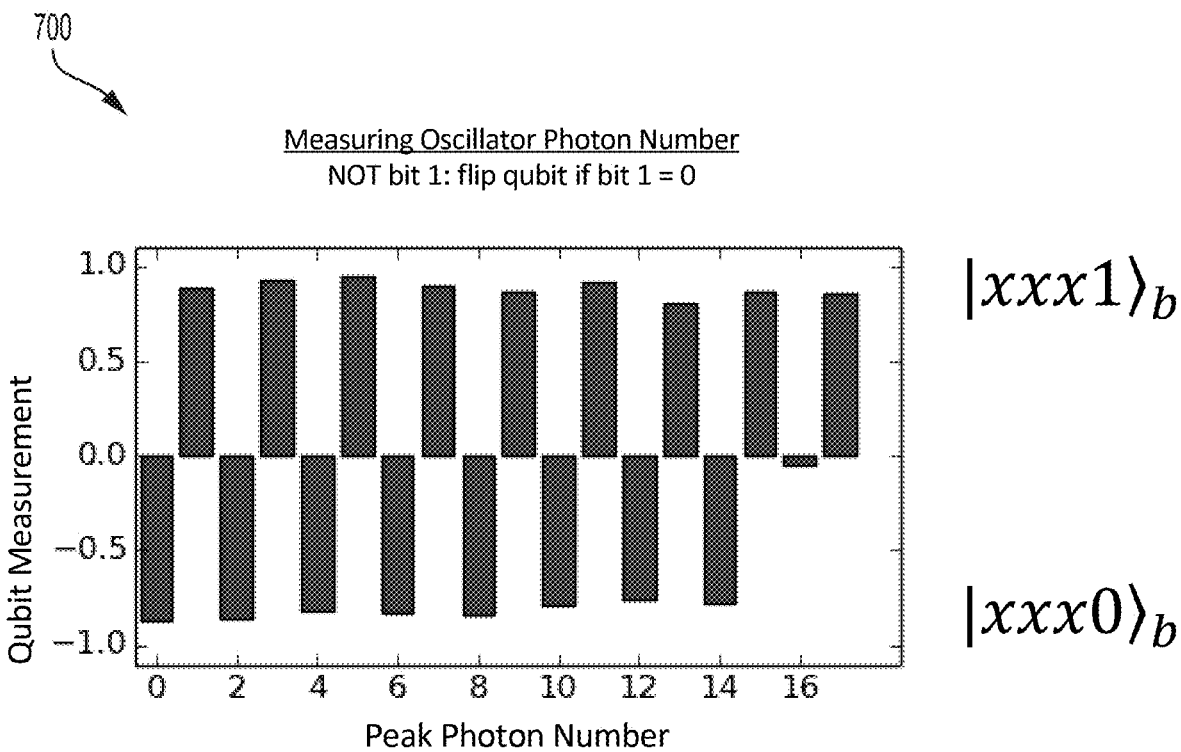
FIGS. 7A-7D illustrate results of applying selected drive pulses to a circuit quantum electrodynamics system in order to measure respective selected bits of a quantum mechanical oscillator being treated as a multi-qubit register, according to some embodiments.

In FIG. 7A, chart 700 illustrates results of measuring the qubit after application of pulse waveforms designed to measure parity of the least significant hit of the oscillator being treated as a four qubit register. After application of the pulse waveforms, the qubit is in the excited state when the oscillator has odd parity and remains in the ground state when the oscillator has even parity. That is, the qubit is in the excited state when the photon number is odd, and is in the ground state when the photon number is even.

Figure 7B:
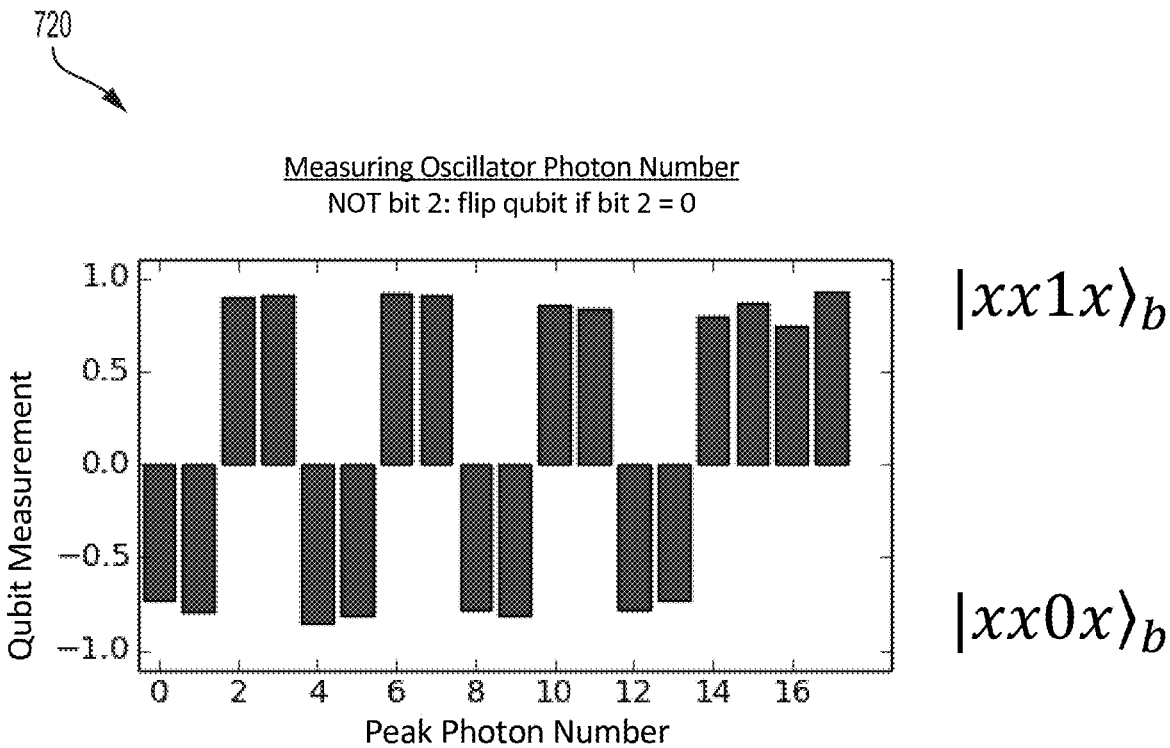
Figure 7C:
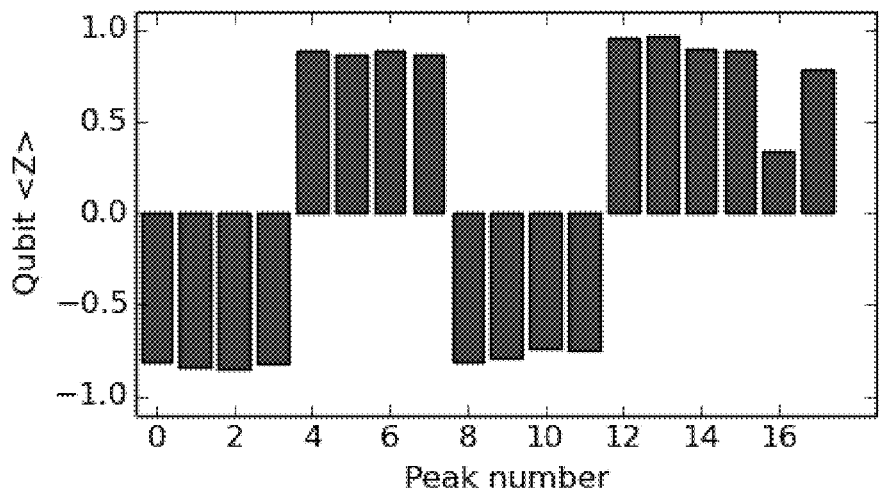
Figure 7D:
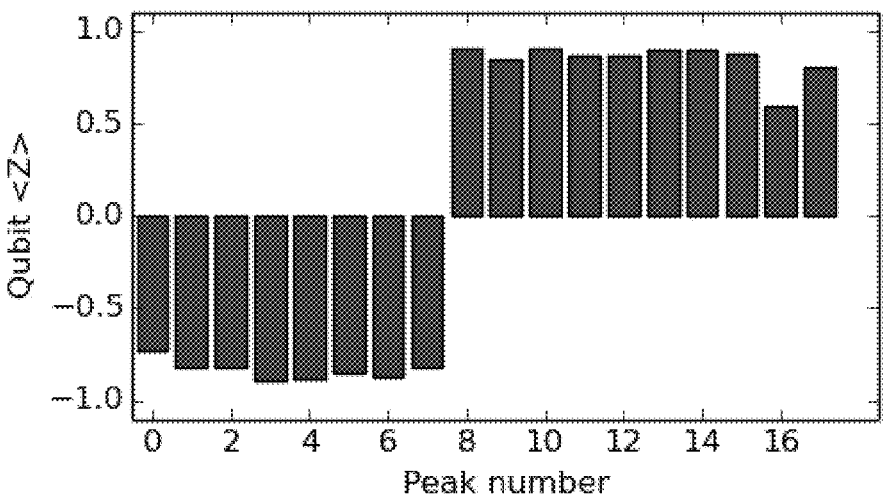

Chart 720 shown in FIG. 7B illustrates results of measuring the qubit after application of pulse waveforms designed to measure parity of the second least significant bit. In this case, the qubit is in the excited state when the photon number divided by 2 is an odd number (ignoring remainders) and is in the ground state when the photon number divided by 2 is an even number (ignoring remainders). FIGS. 7C-7D similarly depict, in charts 740 and 760, respectively, results of measuring the qubit after application of pulse waveforms designed to measure parity of the other bits of the four qubit register.

Figure 8:
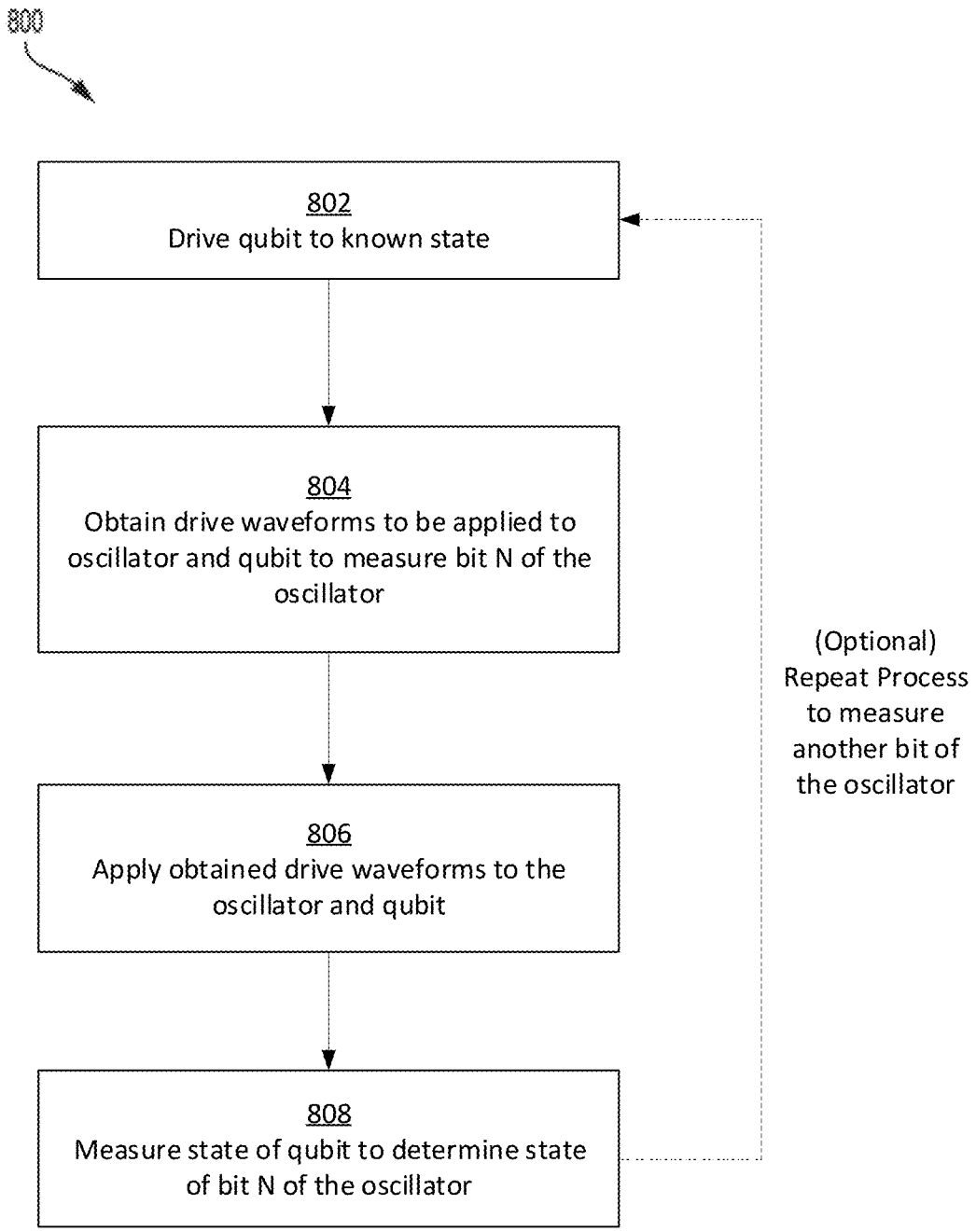
FIG. 8 is a flowchart of a method of measuring selected bits of a quantum mechanical oscillator being treated as a multi-qubit register, according to some embodiments.

FIG. 8 is a flowchart of a method of measuring selected bits of a quantum mechanical oscillator being treated as a multi-qubit register, according to some embodiments. Method 800 may be performed within any suitable quantum mechanical system such as system 100 shown in FIG. 1 or system 200 shown in FIG. 2.

In act 802, the qubit of the system is driven to a known state (e.g., the ground state or the excited state). As discussed above, pulse waveforms may be produced that cause a change in the state of the qubit based on a state of the oscillator to which the qubit is coupled; as such, it is desirable that the qubit be in a known state prior to application of the pulse waveforms so the change in the qubit's state can be ascertained.

In act 804, drive waveforms are obtained (e.g., from a library of precomputed drive waveforms) to measure a particular bit N of the oscillator when treated as a multi-qubit register. N may have any suitable value. In act 806, the obtained drive waveforms may be applied to the qubit and oscillator as described above.

In act 808, the state of the qubit may be measured and information about the state of the oscillator (e.g., bit N of the multi-qubit register) may be determined. The process of acts 802, 804, 806 and 808 may be optionally repeated any number of times to measure multiple bits of the register.

Figure 9:
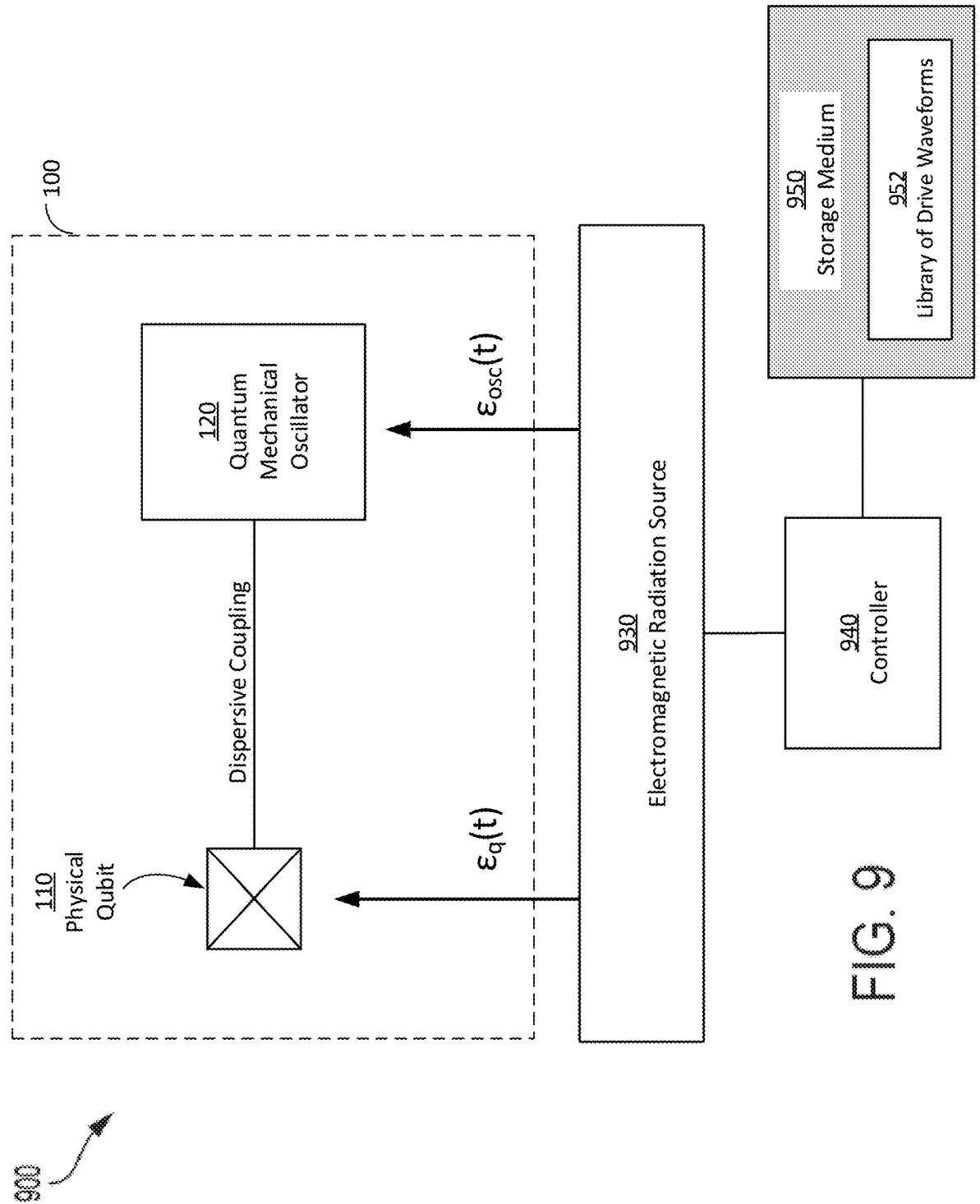
FIG. 9 is a block diagram of a circuit quantum electrodynamics system, according to some embodiments.

FIG. 9 is a block diagram of a circuit quantum electrodynamics system, according to some embodiments. System 900 includes system 100 in addition to electromagnetic radiation source 930, controller 940 and storage medium 950. As discussed above, in some embodiments a library of precomputed drive waveforms may be stored on a computer readable storage medium and accessed in order to apply said waveforms to a quantum system. In the example of FIG. 9, controller 940 accesses drive waveforms 952 stored on storage medium 950 (e.g., in response to user input provided to the controller) and controls the electromagnetic radiation source 930 to apply the drive waveforms $\varepsilon_q(t)$ and $\varepsilon_{osc}(t)$ to the qubit and oscillator, respectively.

Having thus described several aspects of at least one embodiment of this invention, it is to be appreciated that various alterations, modifications, and improvements will readily occur to those skilled in the art.

Such alterations, modifications, and improvements are intended to be part of this disclosure, and are intended to be within the spirit and scope of the invention. Further, though advantages of the present invention are indicated, it should be appreciated that not every embodiment of the technology described herein will include every described advantage. Some embodiments may not implement any features described as advantageous herein and in some instances one or more of the described features may be implemented to achieve further embodiments. Accordingly, the foregoing description and drawings are by way of example only.

Various aspects of the present invention may be used alone, in combination, or in a variety of arrangements not specifically discussed in the embodiments described in the foregoing and is therefore not limited in its application to the details and arrangement of components set forth in the foregoing description or illustrated in the drawings. For example, aspects described in one embodiment may be combined in any manner with aspects described in other embodiments.

Also, the invention may be embodied as a method, of which an example has been provided. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

Various inventive concepts may be embodied as at least one non-transitory computer readable storage medium (e.g., a computer memory, one or more floppy discs, compact discs, optical discs, magnetic tapes, flash memories, circuit configurations in Field Programmable Gate Arrays or other semiconductor devices, etc.) or a computer readable storage device encoded with one or more programs that, when executed on one or more computers or other processors, implement some of the various embodiments of the present invention. The non-transitory computer-readable medium or media may be transportable, such that the program or programs stored thereon may be loaded onto any computer resource to implement various aspects of the present invention as discussed above.

The terms "program," "software," and/or "application" are used herein in a generic sense to refer to any type of computer code or set of computer-executable instructions that can be employed to program a computer or other processor to implement various aspects of embodiments as discussed above. Additionally, it should be appreciated that according to one aspect, one or more computer programs that when executed perform methods of one or more embodiments described herein need not reside on a single computer or processor, but may be distributed in a modular fashion among different computers or processors to implement various aspects of the present invention.

Use of ordinal terms such as "first," "second," "third," etc., in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Also, the phraseology and terminology used herein is for the purpose of description and should not be regarded as limiting. The use of "including." "comprising." or "having," "containing," "involving," and variations thereof herein, is meant to encompass the items listed thereafter and equivalents thereof as well as additional items.

What is claimed is:

1. A method of operating a circuit quantum electrodynamics system that includes a physical qubit dispersively coupled to a quantum mechanical oscillator, the method comprising:
   applying a first modulated drive waveform to the quantum mechanical oscillator; and
   applying a second modulated drive waveform to the physical qubit concurrent with the application of the first modulated drive waveform,
   wherein the first and second modulated drive waveforms are configured to produce a state transition of the circuit quantum electrodynamics system from an initial state to a final state.

2. The method of claim 1, wherein:
   the physical qubit is in a ground state in the initial and final states of the circuit quantum electrodynamics system, and
   the quantum mechanical oscillator has a different photon number state in the final state of the circuit quantum electrodynamics system than in the initial state of the circuit quantum electrodynamics system.

3. The method of claim 1, wherein the physical qubit has a state in the final state of the circuit quantum electrodynamics system that depends upon a photon number state of the quantum mechanical oscillator in the initial state of the circuit quantum electrodynamics system.

4. The method of claim 3, wherein the physical qubit is in a ground state in the initial state of the circuit quantum electrodynamics system, and wherein the physical qubit is in either the ground state or in an excited state in the final state of the circuit quantum electrodynamics system.

5. The method of claim 1, further comprising determining the first and second modulated drive waveforms by optimizing a fidelity of the state transition of the circuit quantum electrodynamics system.

6. The method of claim 5, wherein optimizing the fidelity of the state transition of the circuit quantum electrodynamics system comprises a gradient optimization technique.

7. The method of claim 1, wherein the first and second modulated drive waveforms are selected, based on the initial state and the final state, from a non-transitory computer readable medium storing a plurality of previously determined drive waveforms.

8. The method of claim 1, wherein the state transition is a unitary state change.

9. The method of claim 1, wherein the quantum mechanical oscillator is a microwave cavity.

10. The method of claim 1, wherein the physical qubit is a transmon qubit.

11. The method of claim 1, wherein the dispersive coupling between the physical qubit and the quantum mechanical oscillator has a dispersive shift $\chi$, and wherein a duration of each of the first and second modulated drive waveforms is less than four times $1/\chi$.

12. The method of claim 11, wherein the duration of each of the first and second modulated drive waveforms is less than 1 microsecond.

13. The method of claim 1, wherein the application of the first modulated drive waveform begins at the same time as the application of the second modulated drive waveform begins, and wherein the application of the first modulated drive waveform ends at the same time as the application of the second modulated drive waveform ends.

14. The method of claim 1,
wherein a plurality of photon number states of the quantum mechanical oscillator are selected as a multi-qubit register, and
wherein the first and second modulated drive waveforms are configured to perform a multi-qubit operation upon the multi-qubit register.

15. The method of claim 1, wherein the first modulated drive waveform is centered on a fundamental frequency of the quantum mechanical oscillator, and wherein the second modulated drive waveform is centered on a transition frequency of the physical qubit.

16. A system, comprising:
a circuit quantum electrodynamics system that includes a physical qubit dispersively coupled to a quantum mechanical oscillator;
at least one non-transitory computer readable medium storing a plurality of drive waveforms, each of the plurality of drive waveforms being associated with an initial state of the circuit quantum electrodynamics system and a final state of the circuit quantum electrodynamics system;
at least one controller configured to select a first modulated drive waveform and a second modulated drive waveform from amongst the stored plurality of drive waveforms based at least in part on a selected final state of the circuit quantum electrodynamics system and the final states associated with the selected first and second modulated drive waveforms; and
at least one electromagnetic radiation source configured to:
apply the first modulated drive waveform to the quantum mechanical oscillator; and
apply the second modulated drive waveform to the physical qubit concurrent with the application of the first modulated drive waveform.

17. The circuit quantum electrodynamics system of claim 16, wherein each drive waveform of the plurality of drive waveforms is configured to transition the circuit quantum electrodynamics system from the initial state associated with the drive waveform to the final state associated with the drive waveform.

18. The circuit quantum electrodynamics system of claim 17, wherein a state transition from the initial state to the final state is a unitary state change.

19. The circuit quantum electrodynamics system of claim 16, wherein the plurality of drive waveforms includes a first group of drive waveforms configured to be applied to the quantum mechanical oscillator and a second group of drive waveforms configured to be applied to the physical qubit.

20. The circuit quantum electrodynamics system of claim 16, wherein the quantum mechanical oscillator is a microwave cavity.

21. The circuit quantum electrodynamics system of claim 16, wherein the physical qubit is a transmon qubit.

22. The circuit quantum electrodynamics system of claim 16, wherein the dispersive coupling between the physical qubit and the quantum mechanical oscillator has a dispersive shift $\chi$, and wherein a duration of each of the first and second drive waveforms is less than four times $1/\chi$.

23. The circuit quantum electrodynamics system of claim 16, wherein the at least one controller is further configured to cause the at least one electromagnetic radiation source to:
begin application of the first and second modulated drive waveforms at the same time; and
end application of the first and second drive modulated waveforms at the same time.

24. The circuit quantum electrodynamics system of claim 16, wherein a duration of each of the first and second modulated drive waveforms is less than 1 microsecond.

* * * * *